Dec. 2, 1958   C. CHALICH   2,862,634
MEANS TO TRANSFER ARTICLES FROM CASES TO A CONVEYOR
Filed March 23, 1956   10 Sheets-Sheet 5
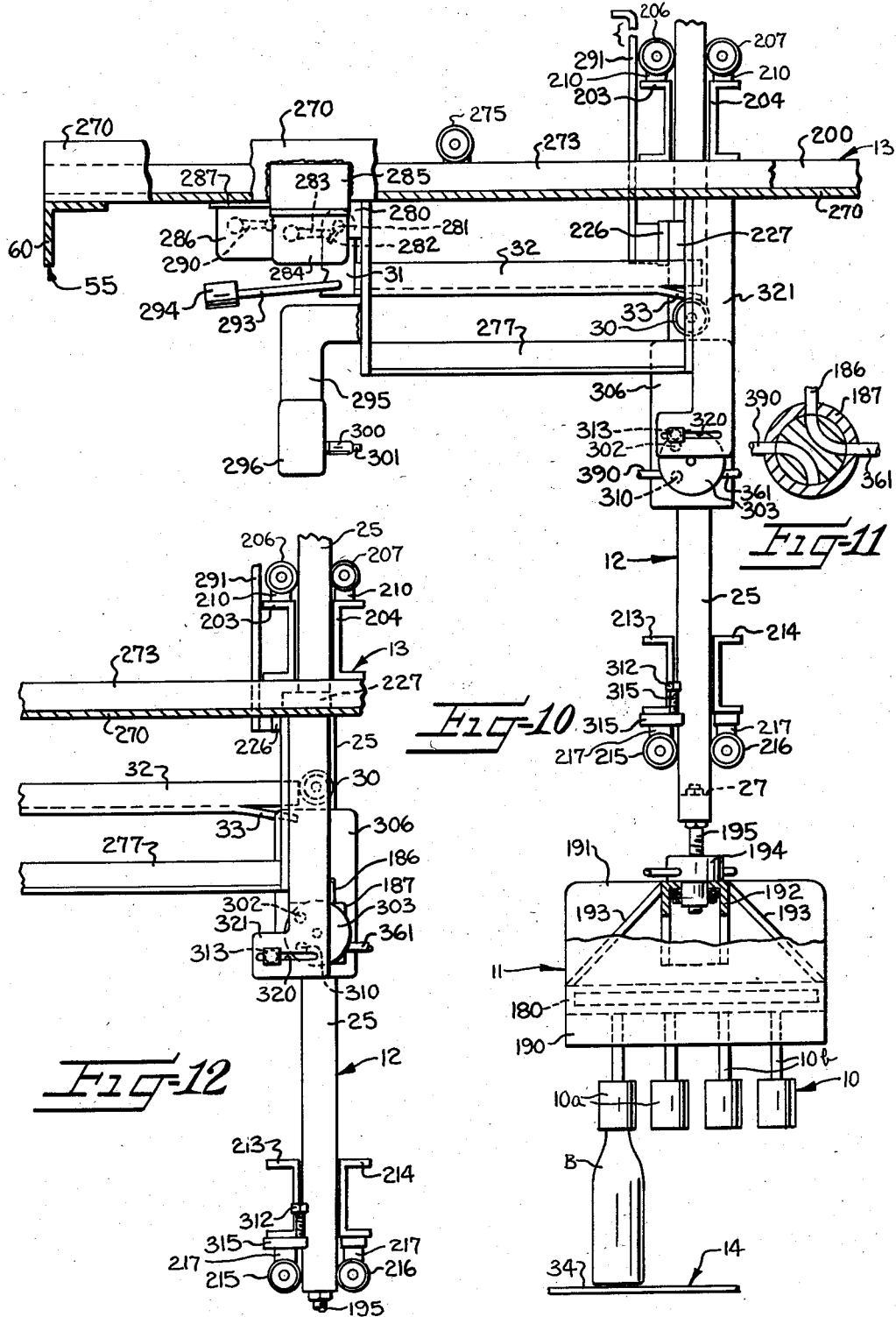

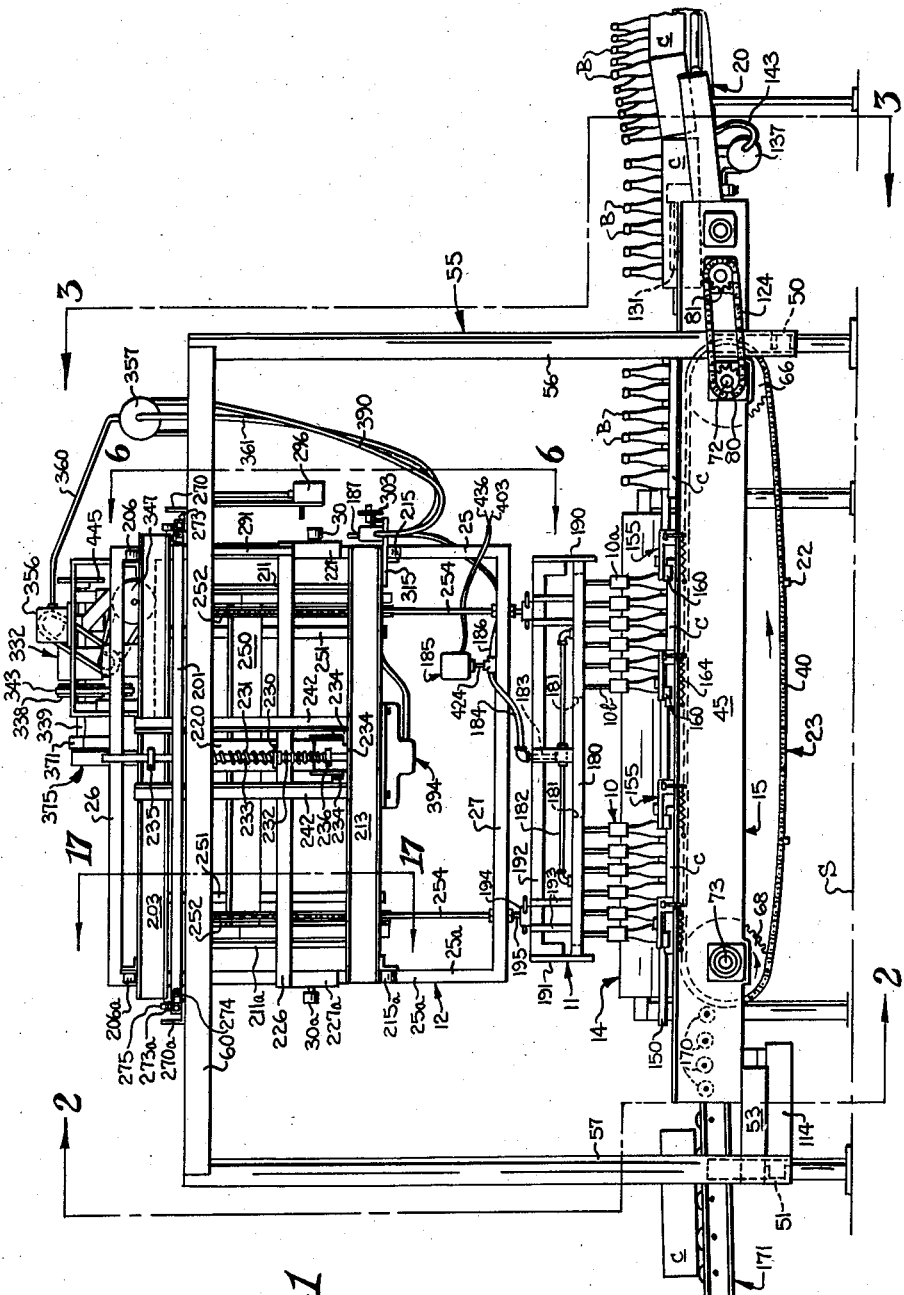

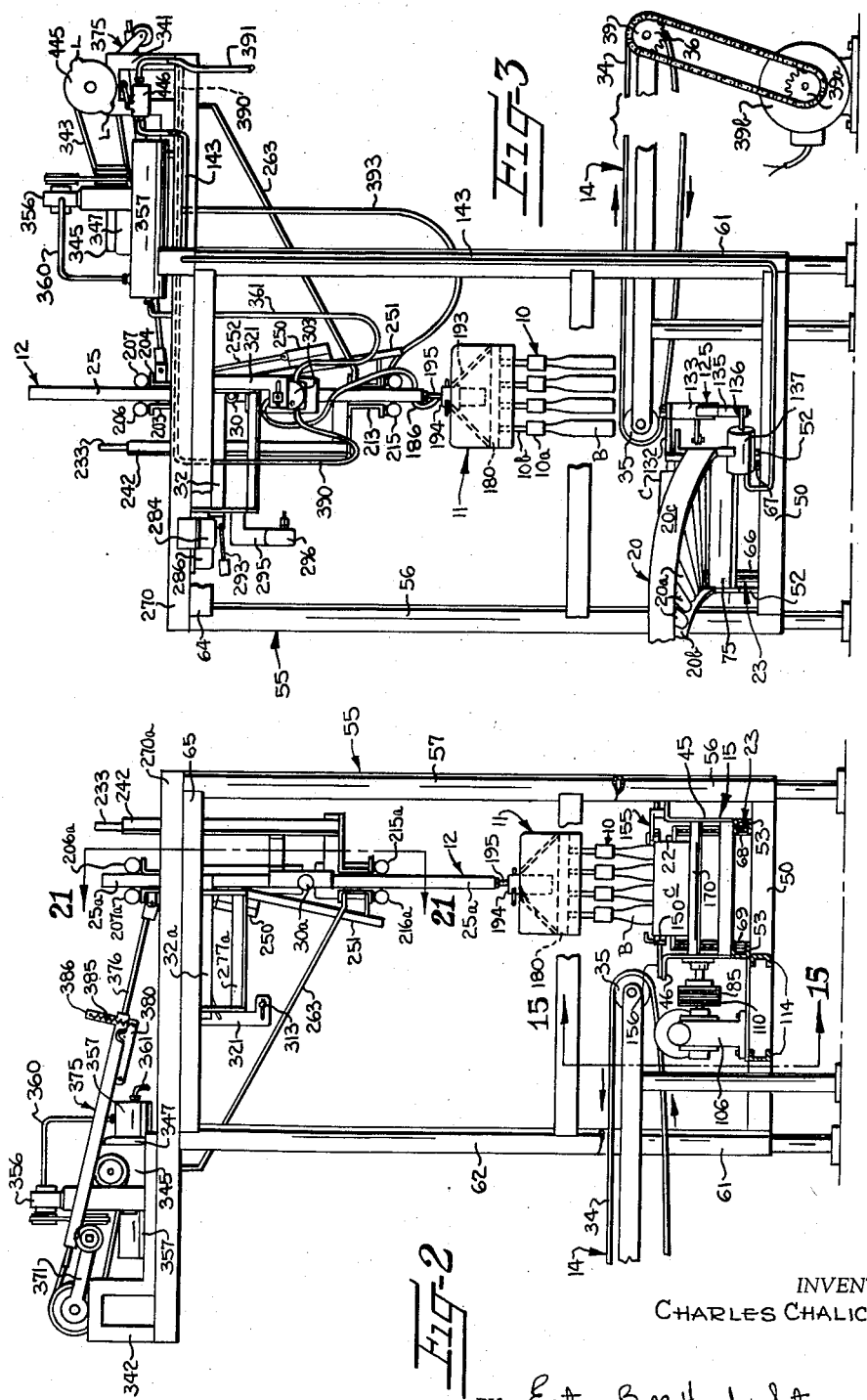

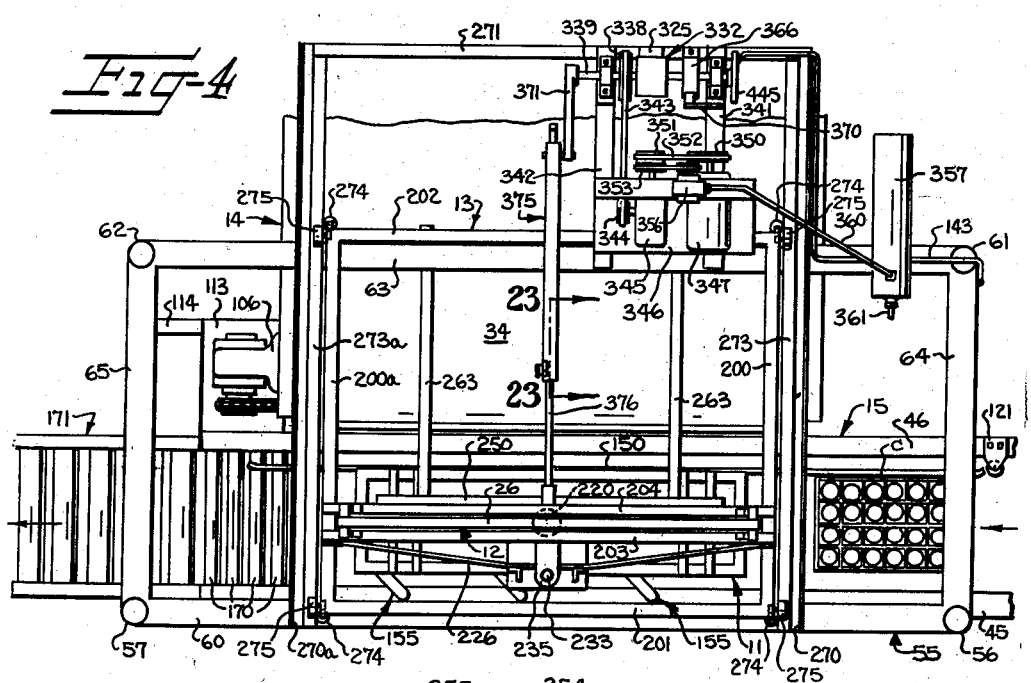
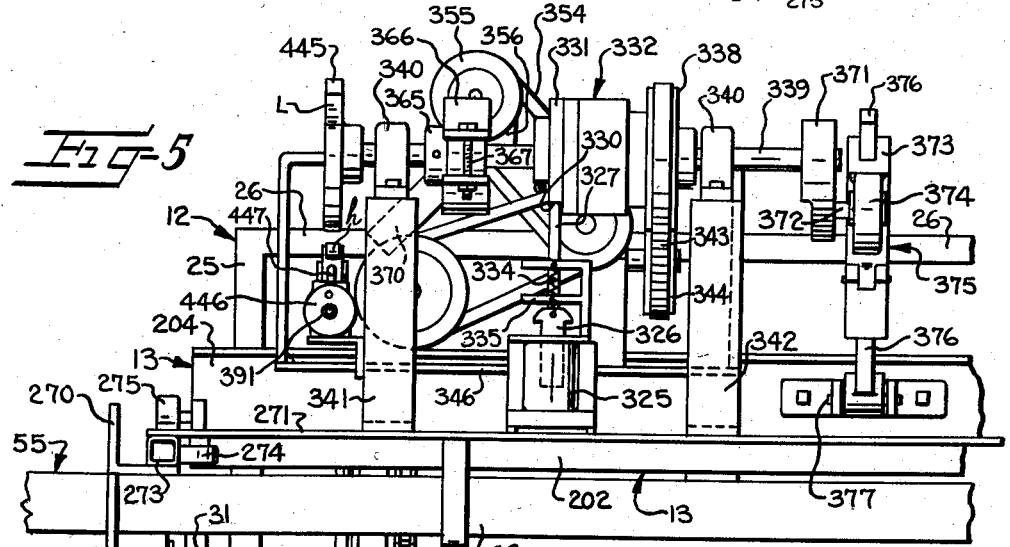

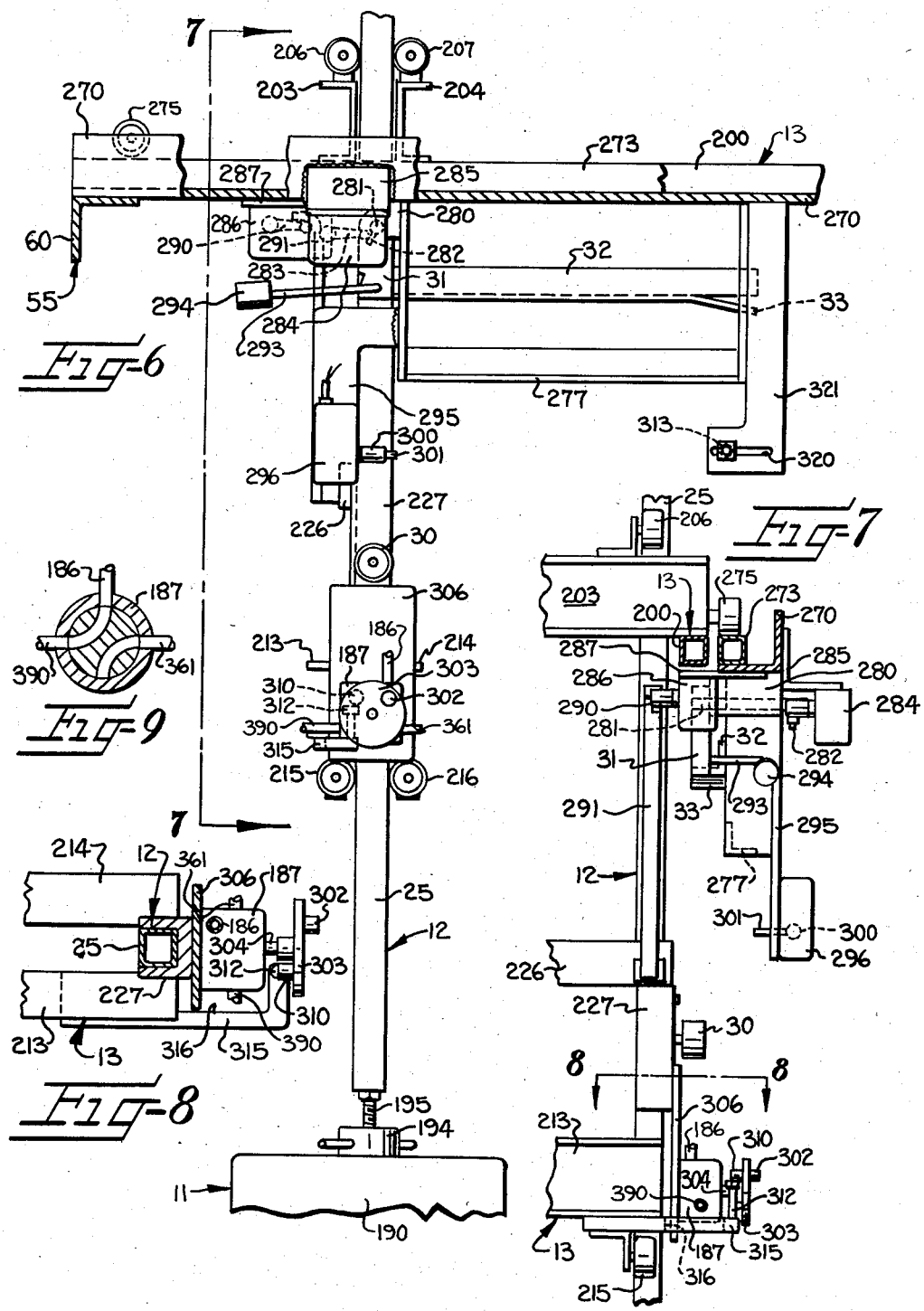

Dec. 2, 1958 C. CHALICH 2,862,634
MEANS TO TRANSFER ARTICLES FROM CASES TO A CONVEYOR
Filed March 23, 1956 10 Sheets-Sheet 6

CHARLES CHALICH,
INVENTOR

BY Eaton, Bell, Hunt & Seltzer
ATTORNEYS

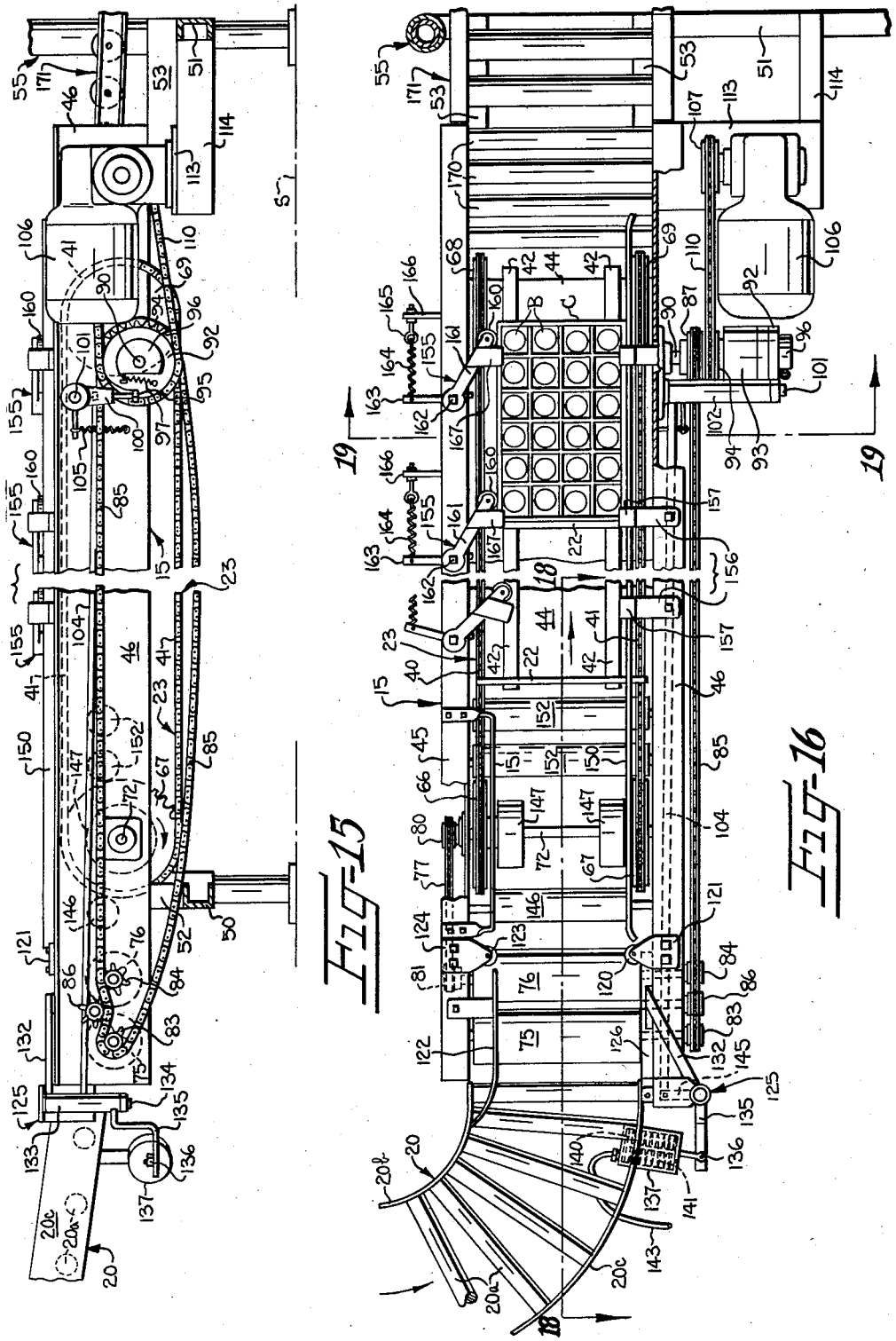

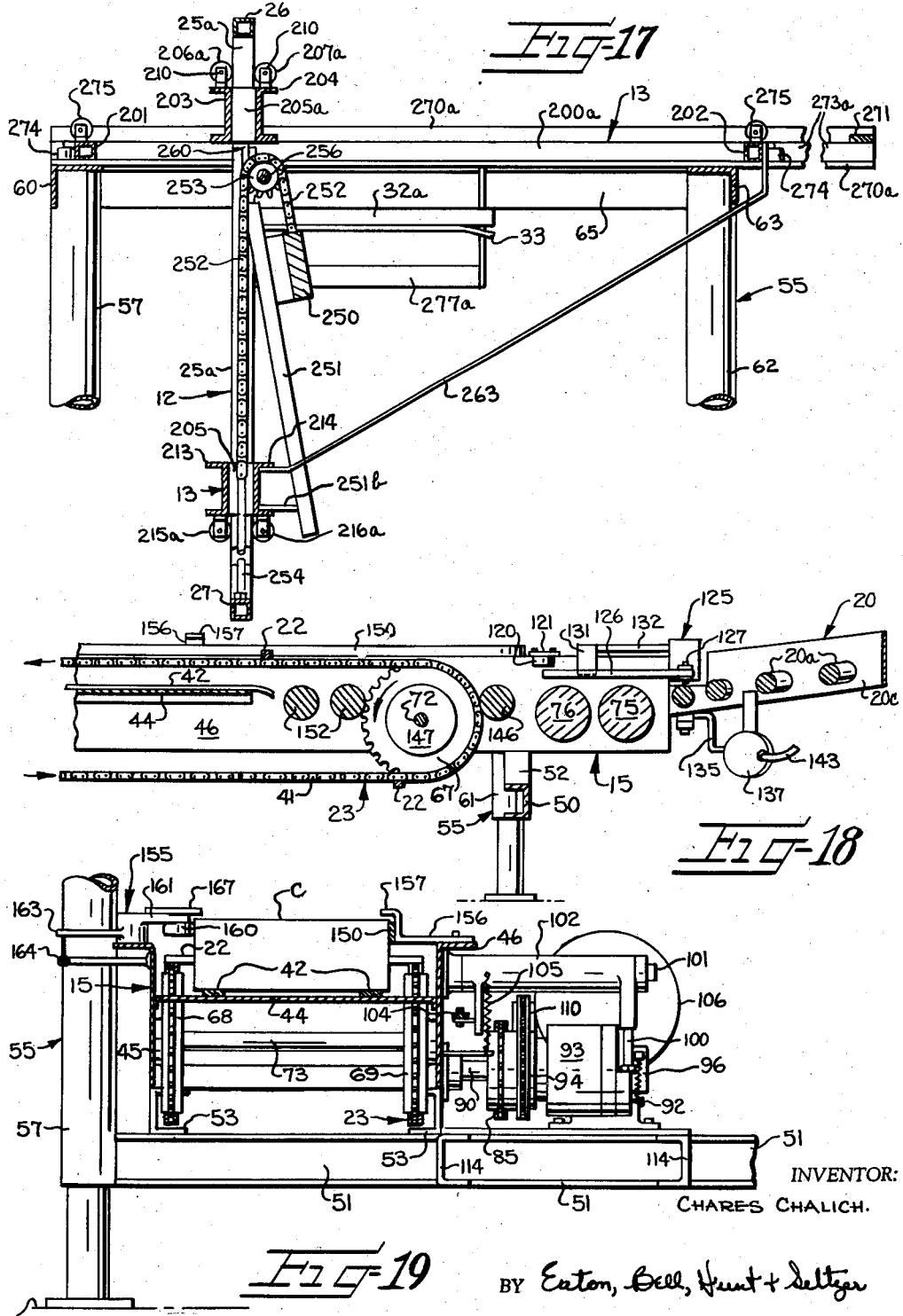

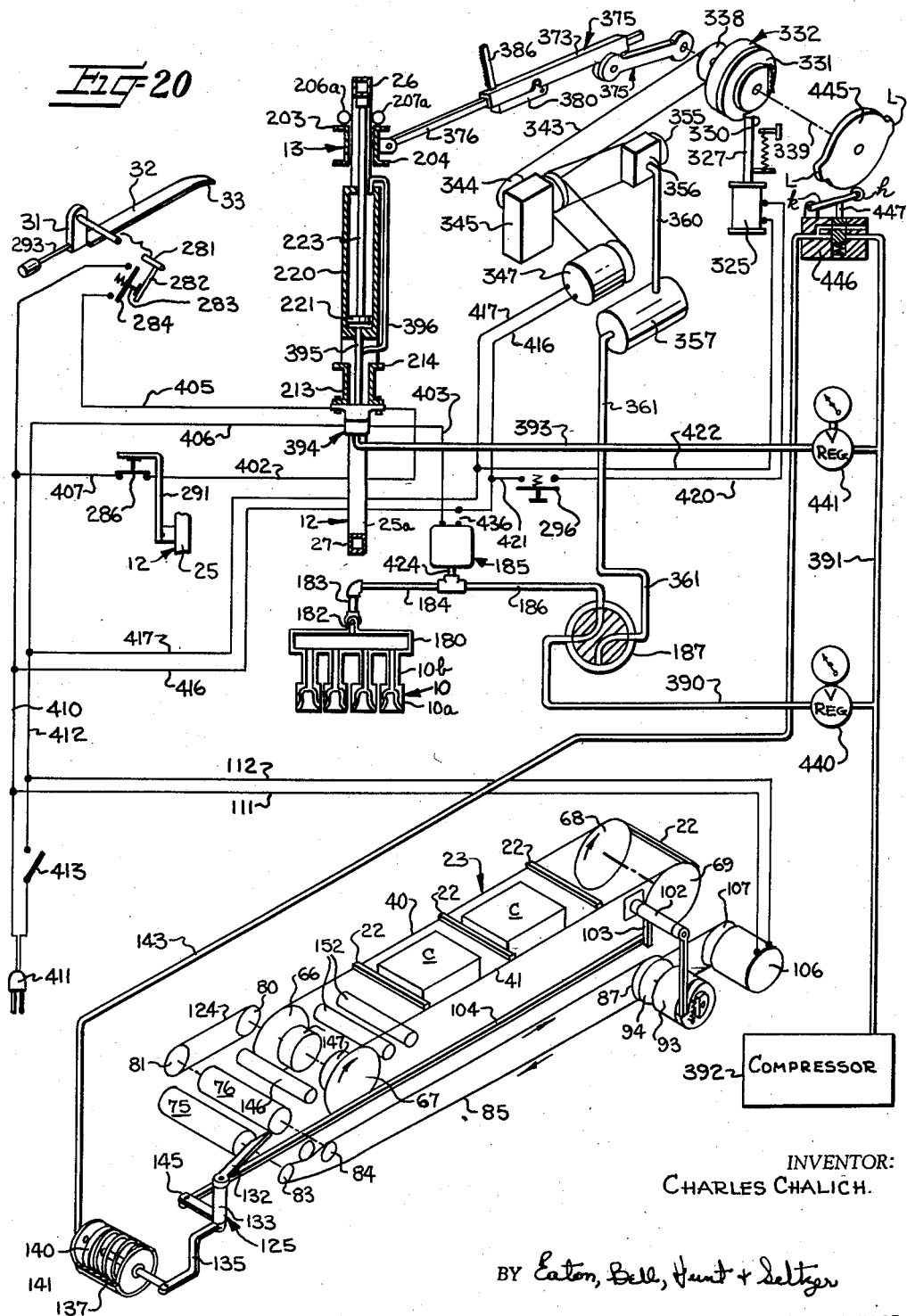

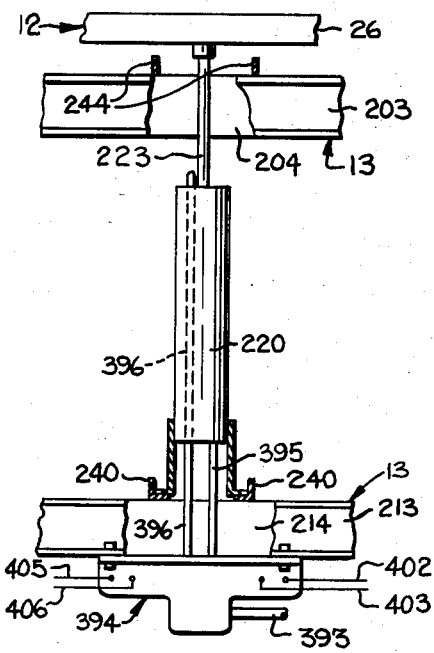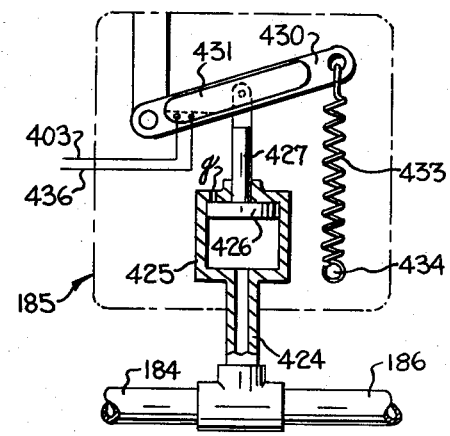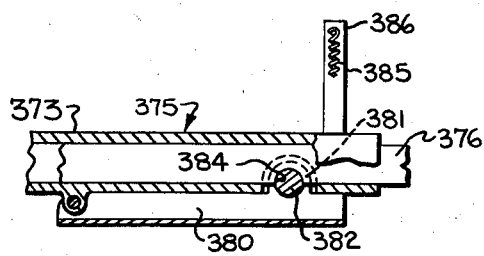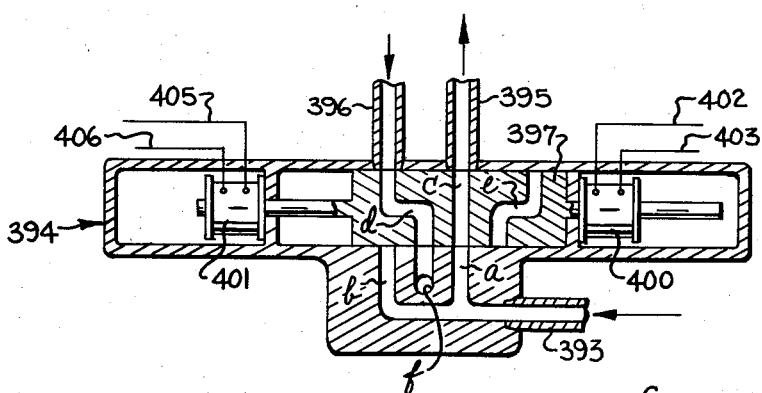

United States Patent Office 2,862,634
Patented Dec. 2, 1958

2,862,634

MEANS TO TRANSFER ARTICLES FROM CASES TO A CONVEYOR

Charles Chalich, Salisbury, N. C., assignor to Taylor Mfg. Co., Inc., Salisbury, N. C., a corporation of North Carolina Application March 23, 1956, Serial No. 573,489

25 Claims. (Cl. 214—309)

This invention relates to case unloaders of the class such as are used in the bottling industry and it is the primary object of this invention to provide improved means for lifting bottles or other containers out of successive cases fed to the lifting zone and transferring the articles to a constantly moving discharge conveyor in such a manner as to insure that the articles will not become upset upon being released from the lifting means as they are deposited upon the constantly moving conveyor. The discharge conveyor may be of a type which feeds bottles to a bottle washing machine.

It is another object of this invention to provide an improved apparatus of the character described which is simply and economically constructed and may be easily maintained and adjusted to operate upon bottles or other containers of different heights.

It is another object of this invention to provide improved means for intermittently feeding spaced pairs of full cases of bottles or other articles to the unloading zone in timed relation to downward movement of corresponding groups of article lifting devices or article grasping and lifting devices, which lifting devices then lift the corresponding bottles in a vertical direction and then move rearwardly above the constantly moving discharge conveyor and then downwardly in a swooping manner to deposit the bottles or other containers upon the conveyor as the bottles are moved at the linear speed of the conveyor and to simultaneously release the bottles and then move upwardly away from the bottles to thereby insure that the bottles will not tip over or become upset as they are deposited upon the constantly moving conveyor. Upon moving upwardly out of engagement with the bottles thus deposited, the grasping devices are then caused to move forwardly relative to the conveyor to receiving position above the means for positioning successive pairs of cases adjacent the ingress end of the conveyor. The groups of grasping devices then commence downward movement to initiate a succeeding cycle.

Some of the objects of the invention having been stated, other objects will appear as the description proceeds when taken in connection with the accompanying drawings, in which—

Figure 1 is a front elevation of the improved apparatus showing the article-engaging or grasping devices in lowered position and engaging bottles in cases previously positioned there beneath;

Figure 2 is a left-hand side elevation of the apparatus taken looking substantially along line 2—2 in Figure 1, with the constantly driven conveyor being broken away;

Figure 3 is a view looking at the right-hand side of the apparatus taken substantially along line 3—3 in Figure 1 and showing the positioned occupied by the grasping devices upon having lifted the bottles out of the corresponding case or cases and preparatory to depositing the bottles upon the constantly moving conveyor;

Figure 4 is a top plan view of the structure substantially as shown in Figure 1;

Figure 5 is an enlarged rear elevation of the means for driving the secondary horizontally movable carriage for the grasping devices and being taken looking substantially along line 5—5 in Figure 3;

Figure 6 is an enlarged elevation partially in section and with parts broken away taken substantially along line 6—6 in Figure 1 and showing the relative position occupied by various elements when the article-engaging members or grasping devices occupy lowered bottling grasping position;

Figure 7 is a fragmentary view partially in section taken substantially along line 7—7 in Figure 6.

Figure 8 is an enlarged fragmentary sectional plan view of a four-way valve control taken substantially along line 8—8 in Figure 7;

Figure 9 is a schematic illustration showing the position of the core of the valve mechanism, shown in the central portion of Figure 6 and the lower right-hand portion of Figure 7, for admitting fluid pressure into the pressure-actuated article-engaging members;

Figure 10 is a view similar to Figure 6, but showing the article grasping devices in position above the conveyor to release the bottles or containers from the grasping devices;

Figure 11 is a view similar to Figure 9 showing the relative position of the core of the valve mechanism as occupied during the releasing of the bottles or containers from the grasping devices;

Figure 12 is a view similar to the upper right-hand portion of Figure 10 showing the carriage for the article grasping means as it is raised following the discharge or release of the bottles from the article grasping devices;

Figure 15 is an enlarged fragmentary elevation taken substantially along line 15—15 in Figure 2 and looking at the opposite side of the case or carton feeding apparatus from that shown in Figure 1;

Figure 16 is a top plan view of the structure shown in Figure 15, with parts broken away and other parts in section;

Figure 17 is an enlarged fragmentary vertical sectional view taken substantially along line 17—17 in Figure 1 showing, in particular, means for substantially counterbalancing the primary or vertically movable carriage;

Figure 18 is a fragmentary longitudinal sectional view through the case-positioning conveyor taken substantially along line 18—18 in Figure 16;

Figure 19 is a transverse vertical sectional view taken along line 19—19 in Figure 16;

Figure 20 is a schematic illustration of the electrical and fluid pressure circuits showing many of the associated mechanical elements of the apparatus schematically for purposes of clarity;

Figure 21 is an enlarged fragmentary view of the cylinder for raising and lowering the primary carriage taken substantially along line 21—21 in Figure 2;

Figure 22 is an enlarged schematic view of an electropneumatic delay-relay 185 shown in the central portions of Figures 1 and 20;

Figure 23 is a detail of the safety lock between mating parts of the composite link taken substantially along line 23—23 in Figure 4;

Figure 24 is an enlarged somewhat schematic sectional view through the four-way valve for controlling flow of fluid pressure through the primary carriage lifting cylinder.

Brief synopsis of the machine

Figures 13, 14:
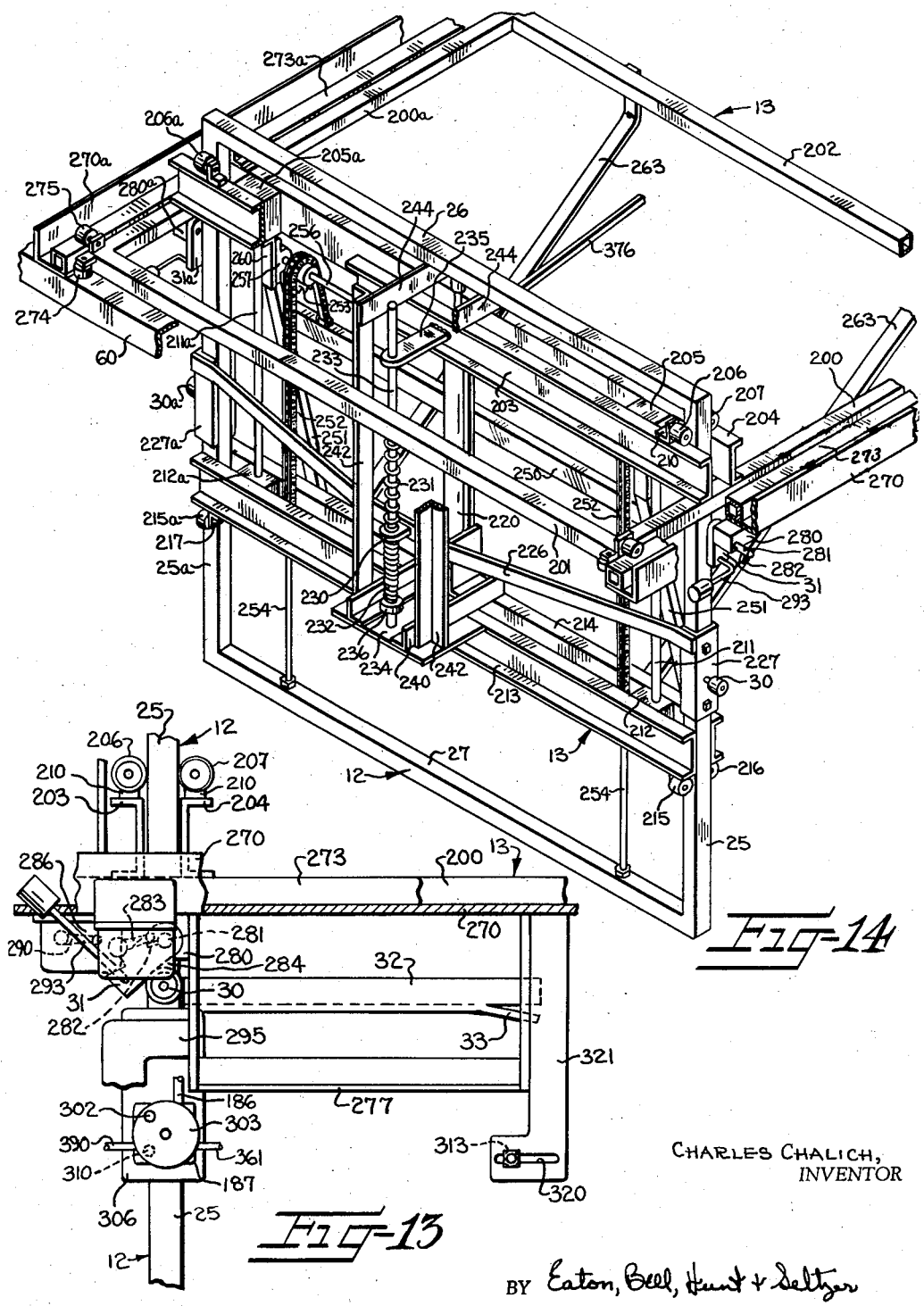
Figure 13 is another view similar to the upper portion of Figure 6 after the carriage for the article grasping devices has returned to its outward position preparatory to another downward stroke being imparted thereto.
Figure 14 is an isometric view of the vertically and horizontally movable composite carriage and the tracks therefor with parts broken away.

The improved case unloading machine generally comprises a pair of spaced groups of spaced pressure-actuated article-engaging or article-grasping members each of which is broadly designated at 10 and which may be of a type substantially as disclosed in the E. Meierjohan U. S. Patent No. 2,695,190 and the C. Schmutzer et al. U. S. Patent No. 2,308,209. The groups of pressure-actuated article engaging members 10 depend from an elongated article carrier broadly designated at 11 which is secured to the lower end of an upright substantially rectangular vertically and horizontally movable primary carriage broadly designated at 12. The main or primary carriage 12 is supported for vertical movement in a secondary or horizontally movable carriage broadly designated at 13. The article grasping devices 10, the article carrier 11 and the two carriages 12, 13 are, at times, disposed outwardly or forwardly of a constantly driven discharge conveyor broadly designated at 14 and above a case-positioner broadly designated at 15.

Cases C containing empty bottles or other containers B are preferably fed to the case-positioner 15 by means of an inclined case-feeding roller conveyor generally designated at 20. A stop means is provided at the ingress end of the case-positioner 15 and, at predetermined intervals, successive cases C are released from the stop means 21 whereupon spaced lugs or flight bars 22 on an intermittently driven conveyor 23 advance two such cases C in predetermined spaced relationship to a position beneath or in the planes of the two groups of grasping devices 10. The latter position may be termed as an unloading or article-receiving zone.

During operation of the improved case unloader, cycles in the operation of the article-engaging devices 10, the carrier 11 and carriages 12, 13 are repeated without interruption, with the exception of the dwells occurring in certain stages of each cycle. Thus, during the interval in which each successive pair of cases C is positioned at the unloading zone, by the positioning conveyor 23, the containers B removed from a previous pair of cases are deposited, at an article-depositing or releasing zone, upon the discharge conveyor 14, in a manner to be later described, and the carriages 12, 13 then move forwardly to a position above the case positioner 15. The primary carriage 12 then moves downwardly so the article-engaging members 10 engage the bottles then in the cases positioned there-beneath, whereupon fluid pressure is admitted to the article-engaging members 10 to cause the same to grip the corresponding bottles B. The carriage 12 then moves upwardly to lift the bottles B out of the cases C therebeneath to where the lower surfaces of the bottles or containers are disposed above the level of the discharge conveyor 14. Upon reaching the limit of its upward stroke, the carriage 12 is automatically moved rearwardly by the carriage 13 to substantially the position shown in Figure 3.

Now, as heretofore stated, the primary vertically movable carriage 12 is of substantially rectangular construction and includes upright side frame members 25, 25a and upper and lower substantially horizontal or cross-frame members 26, 27 and, in order to effect the desired cycle of movements to the carriage 12, the upright side frame members 25, 25a of the main carriage 12 have respective outwardly projecting follower means in the form of rollers or guide track-engaging elements 30, 30a thereon which, in the course of upward movement of the primary carriage 12 engage the lower surfaces of respective keeper cams or latches 31, 31a (Figures 6, 7, 10, 12, 15 and 14).

As will be later described, the main or primary carriage 12 is yieldably moved upwardly by motive means operated by fluid pressure so the keeper cams 31, 31a are resiliently or yieldably engaged by the rollers 30, 30a. As the rollers 30, 30a engage the lower surfaces of the keeper cams 31, 31a, their upper surfaces are then alined with the lower surfaces of respective primary carriage-controlling or guiding tracks 32, 32a which extend rearwardly from the respective keeper cams 31, 31a and are suitably secured to fixed parts of the apparatus. The main or primary carriage tracks 32, 32a extend in substantially parallel relation to, and overlie the upper run of, the discharge conveyor 14. The rear end of each of the tracks 32, 32a is provided with a downwardly and rearwardly inclined dipping or swooping cam portion 33 thereon which causes the rollers 30, 30a and, consequently, the primary carriage 12, to move downwardly in a swooping motion after the carriages 12, 13 have moved rearwardly sufficiently to where the bottles or other containers B then held by the pressure-actuated article-engaging members 10 are all positioned well over the discharge conveyor 14.

It is apparent that the lower rearmost edge of each of the inclined cam portions 33 is spaced above the conveyor 14 so that the lower surfaces of the bottles or other containers B then held by the article-engaging members 10 will rest lightly against the upper run of the conveyor 14. The rearward stroke of the carriages 12, 13 is such that the rollers 30, 30a move rearwardly beyond the downwardly and rearwardly inclined portions 33 of the tracks 32, 32a. Since the rollers, 30, 30a and the carriage 12 are biased upwardly under fluid pressure, it is apparent that movement of the rollers 30, 30a beyond the rear ends of the inclined portions 33 of the tracks 32, 32a will permit the rollers 30, 30a to move upwardly with a short, quick stroke to raise the article-engaging members 10 out of engagement with the bottles B, the pressure having been released from the article-engaging members 10 as the rollers 30, 30a moved in engagement with the inclined portions 33 of the tracks 32, 32a.

The carriages 12, 13 are then caused to move forwardly, by means to be later described, in the course of which the rollers 30, 30a are moved above the tracks 32, 32a. As the carriages 12, 13 approach the end of each successive forward stroke thereof, the rollers 30, 30a engage the respective keeper cams or latches 31, 31a and swing the same forwardly therewith, whereupon the pressure is automatically released or reversed in the fluid pressure means which raises the carriage 12 so the carriage 12 then moves downwardly to complete a cycle in its operation.

The discharge conveyor 14 may be of conventional type such as is used for alining bottles with a bottle washing machine. In this instance the conveyor 14 includes an endless belt 34 mounted on rollers 35, 36 journaled in a frame 37. The rear roller 36 is driven by a motor 38 (Figure 3) connected to the roller 36 by means of sprocket wheels 39, 39a and a sprocket chain 39b. The motor 38 may be electric and drives conveyor 14 at a speed corresponding to the speed of reciprocation of the secondary carriage 13.

The case-positioner

The case-positioning or indexing conveyor 23 of the case-positioner 15 is of the endless type and comprises a pair of spaced parallel endless elements shown in the form of sprocket chains indicated at 40, 41 (Figures 1, 15, 16, 18, 19 and 20). The sprocket chains 40, 41 are spaced sufficiently apart to permit the cases C to pass there between without engaging the same and these sprocket chains 40, 41 have opposite ends of a plurality of the longitudinally spaced flight bars 22 fastened thereto which intermittently engage and propel cases C along slide tracks 42. The slide tracks 42 extend longitudinally of the case-positioner 15 and are spaced below the level of the upper runs of the sprocket chains 40, 41 (Figures 18 and 19) and are suitably secured to a platform 44 whose opposite side edges are suitably secured to longitudinal case-positioner frame members 45, 46.

The frame members 45, 46 straddle the sprocket chains 40, 41. Opposite ends of the case-positioner frame members 45, 46 are supported on forwardly and rearwardly extending frame members 50, 51, which extend transversely of the case-positioner conveyor 15, by means of brackets 52, 53. The frame members 50, 51 are parts of a main machine frame broadly designated at 55 and their front ends are suitably secured to respective front columns 56, 57, which rest upon the floor or other surface S supporting the machine, and whose upper ends are spanned by an upper horizontally disposed front frame member 60. The rear ends of the frame members 50, 51 are suitably secured to rear upright columns 61, 62 whose upper ends are spanned by and suitably secured to opposite ends of a rear upper transverse frame member 63 (Figure 4). Opposite ends of upper forwardly and rearwardly extending frame members 64, 65, spaced above the respective lower frame members, 50, 51, are suitably secured to the respective front and rear columns 60, 61 and 57, 62.

It will be observed in Figures 1, 15, 16, 17, 18 and 20 that the sprocket chains 40, 41 of the case-positioning conveyor 23 are mounted on respective pairs of sprocket wheels 66, 67 and 68, 69 fixed on respective shafts or axles 72, 73 suitably journaled in the longitudinally extending case-positioner frame members 45, 46. One end of the shaft 72 extends through frame member 45 and is connected to the reduced end of one of a pair of friction rollers 75, 76 by means of a sprocket chain 77 and a pair of sprocket wheels 80, 81 (Figures 1 and 15). It will best be observed in Figures 15 and 16 that the reduced ends of the friction rollers 76, 75 are journaled in the longitudinal case-positioner frame members 45, 46 adjacent the ingress end of the case-positioner 15.

The reduced ends of the friction rollers 75, 76, opposite from that end of the roller 76 to which the sprocket wheel 81 is secured, are provided with respective sprocket wheels 83, 84 which are engaged by an endless sprocket chain 85. An idler sprocket wheel 86 carried by the longitudinal case-positioner frame member 46 is positioned between and above the sprocket wheels, 83, 84 for maintaining the upper run of the sprocket chain 85 in engagement with the sprocket wheels 83, 84. The sprocket chain 85 is also mounted on a sprocket wheel 87 (Figures 16 and 19) fixed on a shaft 90, one end of which is journaled in the longitudinal frame member 46 and the other end of which has a single revolution clutch mechanism 91 mounted thereon.

The single revolution clutch mechanism 91 may be of a type substantially as disclosed in a patent to Richard D. Dickens No. 2,140,737, dated December 20, 1938. Therefore, a complete illustration and description of the clutch mechanism 91 is deemed unnecessary. It might be stated, however, that the clutch mechanism 91 includes a cam plate 92 which loosely encircles the shaft 90 and is effective in normally maintaining a fixed connection between a hub member 93 and a sprocket wheel 94 on the shaft 90 when the cam plate 92 is operative position, to which it is urged by a tension spring 95 (Figure 15.) One end of the tension spring 95 is connected to the outer face of the cam plate 92 and its other end is connected to an outer hub plate 96 which is also, at times, rotatable relative to the shaft 90. The elements 92, 93, 95 and 96 are the equivalent of the respective elements 21, 7, 25 and 23 shown in said Patent No. 2,140,737.

It will be observed in Figures 15 and 19 that the cam plate 92 is formed with a cam surface culminating in a raised portion or shoulder 97 with which a trip bar 100 may engage. The trip bar 100 is in the form of a crank depending from a sleeve 102 oscillatably mounted on a pivot shaft 101 extending rearwardly from and being suitably journaled on the longitudinal case-positioner frame member 46 (Figures 16 and 19). The sleeve 102 also has a crank 103 depending therefrom to which one end of a link 104 is connected (Figures 19 and 20). The link 104 is operated at predetermined intervals, by means to be later described, to momentarily move the latch or trip bar 100 out of engagement with the shoulder 97 on the cam plate 92 of the single revolution clutch mechanism 91. A spring 105 assists in returning the trip bar 100 into the operating position shown in Figure 15.

The sprocket wheel 94 is driven continuously by means of an electric motor 106 having a sprocket wheel 107 fixed on the shaft thereof which is connected to the sprocket wheel 94 by means of a sprocket chain 110 (Figure 16). Referring to Figure 20, the electric motor 106 has conductors 111, 112 leading therefrom and connected to an electrical circuit to be later described. The electric motor 106 is mounted upon a plate 113 (Figures 1, 16 and 19) suitably secured on frame members 114 which project outwardly and are suitably secured to the lower forwardly and rearwardly extending frame member 51.

It is apparent that continuous rotation of the sprocket wheel 94 in a clockwise direction in Figures 15 and 20 tends to rotate the cam plate 92 in a like direction. However, when the intermediate cam plate 92 is restrained from rotation, as by the trip bar 100 engaging the shoulder 97, the tension spring 95 permits relative movement between the cam plate 92 and the hub 93 (Figures 16 and 19) whereby conventional means, not shown in the present application but clearly shown in said Patent No. 2,140,737, permits the sprocket wheel 94 to rotate freely on the shaft 90.

Of course, upon movement of the trip bar 100 to inoperative position; out of engagement with the shoulder 97 on the cam plate 92 of the single revolution clutch mechanism 91, the tension spring 95 causes the cam plate to swing about its pivot point to establish a fixed connection between the sprocket wheel 94 and shaft 90 by means clearly shown in said Patent No. 2,140,737.

It is apparent that, whenever the link 104 is actuated in a manner to be later described to cause the trip bar 100 to move out of engagement with the shoulder 97 on the cam plate 92, the tension spring 95 causes the cam plate 92 to swing about its pivot point to establish a fixed connection between the sprocket wheel 94 and the shaft 90 by means clearly shown in said Patent No. 2,140,737. With rotation of the cam plate 92, the spring 105 assists in urging the trip bar 100 into engagement with the periphery of the cam plate 92, since the link 104 is actuated only momentarily, whereupon the trip bar 100 will engage the shoulder 97 to disengage the clutch mechanism and cause the shaft 90 to rotate exactly one revolution each time the link 104 is actuated.

The case-feeding roller conveyor 20 is preferably inclined as shown in Figures 1, 3, 15 and 18 and includes rollers 20a journaled in side members 20b and 20c whose lower portions are preferably curved as shown in Figure 16 so the centrifugal force of movement of successive cases C along the roller case-feeding conveyor 20 will cause the same to tend to move rearwardly against the lower curved portion of the side member 20c of the roller case-feeding conveyor 20. The case-feeding roller conveyor 20 may be of conventional construction and may be suitably supported in the desired relation to the ingress or feed end of the positioner 15 and, accordingly, a further detailed description thereof is deemed unnecessary.

It will be noted that the lower ends of the side members 20b, 20c, of the case-feeding roller conveyor 20 are spaced substantially the same distance apart as the longitudinal case-positioner members 45, 46 and the upper surfaces of the lowermost rollers 20a of the case-feeding roller conveyor 20 are preferably positioned on substantially the same or a slightly higher level than the friction rollers 75, 76 (Figure 18). Thus, as cases C, are successively moved onto these friction rollers 75, 76 one corner portion thereof is thrown, by gravity, against a stop 120 which extends rearwardly and outwardly and is shown in the form of a roller depending from a bracket 121 suitably secured to the upper portion of the longitudinal frame member 46 of the case-positioner 15 (Figures 16 and 18). A case-feeding side guiding bar or plate 122 is also suitably supported by the front longitudinal frame member 45 to further insure that each successive case engages the stop 120. A roller 123 is also provided opposite the roller 120 and is carried by a bracket 124 suitably secured to the longitudinal frame member 45 of the case-positioner 15. As each successive case engages the stop 120, it also moves past and against an automatic case deflector mechanism, broadly designated at 125, and which includes a deflector bar 126 (Figures 15, 16 and 18) pivoted at 127 on the inner portion of a bracket 130. The bracket 130 is suitably supported on the ingress end of the frame member 46.

The bar 126 extends toward the egress or discharge end of the case-positioner conveyor 15 and terminates below the roller 120. The case deflector bar 126 is engaged by a downwardly projecting portion 131 of a crank 132 which, as best shown in Figure 15, is connected to an upright sleeve 133. The sleeve 133 is journaled on a post 134 carried by the bracket 130 and also has an arm or crank 135 extending from the lower portion thereof whose free end is pivotally connected to one end of a piston rod 136. The piston rod 136 loosely penetrates the head of a cylinder 137 and is connected to a piston or diaphragm 140 within the cylinder 137. A spring 141 normally urges the diaphragm or piston 140 forwardly or to inoperative position. The end of the cylinder 137 opposite from that which is penetrated by the piston rod 136 has one end of a fluid pressure conduit or air conduit 143 connected thereto which extends to means to be later described for controlling the flow of fluid pressure at the cylinder 137.

It will be noted that the sleeve 133 also has a crank 145 projecting forwardly or inwardly therefrom (Figures 16 and 20) to which the end of the link 104 remote from the single revolution clutch mechanism 91 is pivotally connected. It is thus seen that the friction rollers 75, 76 are normally stationary and, at a predetermined time in the course of each successive cycle of the machine, fluid pressure is applied in line or conduit 143 to cause the piston rod 136 to move outwardly relative to the cylinder 137 and to thereby impart counterclockwise movement to the cranks 132, 135 and 145 in Figures 16 and 20.

It is apparent that this will cause the link 104 to move from right to left in Figure 16 to thereby effect operation of the single revolution clutch mechanism 91 and to impart a stroke to the case-positioner conveyor 23. Now, at the same time that the clutch mechanism 91 is caused to effect a stroke by the case-positioner conveyor 23, it is apparent that the crank 132 imparts an inward stroke to the case-deflecting arm or bar 126 so the corresponding case C is released from the stop 120 and is propelled from left to right in Figure 16 by the friction rollers 75, 76. These rollers 75, 76 also propel the corresponding case across an idler roller 146 and, thence, onto a pair of spaced drum-like rollers 147 fixed on the shaft 72.

It is apparent that the rollers 147 further assist in imparting movement to the corresponding case C as it moves between a pair of spaced case-positioning side guides 150, 151. This also moves the corresponding case onto a pair of idler rolls 152 to insure that the rear edge of the case is engaged by the next succeeding flight bar 22 on the case-positioning conveyor 23 to propel the corresponding case a predetermined distance onto and along the case-positioner tracks 42. Referring to Figure 1, this latter movement of the case-positioning conveyor 23 will position a case C beneath the right-hand set or group of article-engaging members 10 and the next succeeding stroke of the conveyor 15 will move the latter case to a position beneath the left-hand group of article-engaging members 10 and will move the next succeeding case to a position beneath the right-hand group of article-engaging members 10 as shown in Figure 1.

In order to insure that each successive case is accurately positioned laterally of the conveyor 15, so the bottles or other containers B therein are properly alined with the corresponding groups of article-engaging members 10, as each case is positioned beneath either set of article-engaging members 10, its front surface is engaged by a pair of pressure elements 155 which press the corresponding case against the side track 150. It will be observed in Figure 15 that the side track 150 is of substantially greater length than the side track 151.

The side tracks 150, 151 are suitably secured to the upper portions of the longitudinal case-positioner frame members 45, 46. In this instance, each end of the side track 151 is bent outwardly or forwardly relative to the longitudinal axis of the case-positioner 15 and is fixed to the front longitudinal frame member 45 while the side track 150 is fixed to a plurality of longitudinally spaced brackets 156 which are, in turn, suitably secured to the flanged upper portion of the longitudinal frame member 46. The brackets 156 are also provided with inwardly projecting lip portions 157 thereon which overlie the upper edges of the corresponding cases C to thereby insure that the cases are not drawn upwardly with the bottles or other containers B as they are lifted out of the cases.

The case-positioner pressure elements 155 each comprises a roller 160 which is adapted to engage the corresponding case C and which is journaled on an arm 161. Each arm 161 extends outwardly at an angle to the path of travel of the cases C and is pivotally mounted, as at 162, on the flanged upper portion of the corresponding front longitudinal case-positioner frame member 45. Each arm 161 has an outwardly projecting extension 163 to which one end of a tension spring 164 is connected. The other end of the tension spring 164 is connected to an eye member 165 adjustably secured to a bracket 166 projecting outwardly from the longitudinal case-positioner frame member 45.

It is thus seen that the rollers 160 are normally urged inwardly toward the center of the case-positioner 15. Each of the arms 161 is provided with a case-hold-down member 167 thereon which also overlies the corresponding edge of the corresponding case C to further assist in preventing the case from moving upwardly when the bottles or other containers B are lifted therefrom.

It should be noted that, as each successive case containing bottles or other containers B is positioned beneath the second of left-hand group of article-engaging members 10 in Figure 1, the preceding case C is moved forwardly or to the right in Figures 15 and 16 off the tracks 42 and onto idler rollers 170 which are also journaled in the longitudinal frame members 45, 46 and which direct the corresponding case onto a suitable roller conveyor generally designated at 171. The roller conveyor 171 may be constructed and supported in any desired manner and does not necessarily constitute a part of the present invention and, therefore, a detailed description thereof is deemed unnecessary.

*Article carrier head*

As heretofore stated, the article-engaging or grasping members 10 may be of a type such as is disclosed in Patent No. 2,695,190 and each includes a cup-like member 10a provided with a resilient tubular extension 10b for controlling the flow of fluid pressure into and out of the cup-like members 10a. As fully disclosed in said last-mentioned patent, the introduction of fluid pressure into the article-engaging members 10 causes the article-engaging members to tightly engage the corresponding articles of containers B and, when fluid pressure is exhausted from the article-engaging or grasping members 10, the bottles or other containers B are released therefrom.

The upper ends of the resilient tubular members 10b are connected to a common elongated and sealed manifold enclosure 180 (Figures 1, 2, 3 and 20) which is preferably provided with a pair of spaced partitions 181 therein to form separate chambers in the manifold 180 for the separate groups of article-engaging members 10. Each of the latter chambers has one end of a pipe or conduit 182 connected thereto and these pipes 182 extend inwardly and are connected to a common branch pipe 183 to which one end of a flexible pipe or conduit 184 is connected. The pipe or conduit 184 leads to a flexible conduit 186 connected to a suitable four-way valve 187. A suitable fluid pressure delay-relay 185, to be later described in detail, is connected at the juncture of conduits 184, 186 and supported on bar 27 (Figure 1). The four-way valve 187 (Figures 1, 6 to 13, inclusive, and 20) automatically controls the flow of fluid pressure or compressed air into and out of the manifold 180 in a manner to be later described.

The manifold 180 is suitably secured at opposite ends thereof to end members 190, 191 of the carrier head 11. The end members 190, 191 extend upwardly and are suitably secured to opposite ends of a substantially horizontally disposed frame member 192. The frame member 192 is also provided with braces 193 which extend downwardly and outwardly therefrom and are suitably secured to the manifold 180. The frame member 192 has a pair of spaced manually adjustable nuts 194 suitably attached thereto for rotation therein (Figure 10) and through which the lower portions of screws 195 are threaded. The upper portions of the screws 195 are fixed in the lower substantially horizontally disposed frame member 27 of the primary carriage 12. It is apparent that, by rotating the nuts 194, the screws 195 will cause the carrier head 11 to move upwardly or downwardly so the article-engaging members 10 may be accurately adjusted relative to the primary carriage 12 to accommodate bottles or containers of varying height.

*The primary and secondary carriages*

As heretofore stated, the primary or vertically movable carriage 12 is in the form of a substantially upright rectangular frame and is guided for vertical movement in the auxiliary or secondary carriage 13. To this end, it will be best observed in Figure 14 that the secondary carriage 13 is of generally T-shaped or inverted L-shaped construction with its upper part being substantially rectangular and including opposed substantially horizontally disposed forwardly and rearwardly extending side frame members 200, 200a and front and rear frame members 201, 202. Closely spaced transverse beams or frame members 203, 204 are suitably secured upon and span the distance between the frame members 200, 200a and spacing blocks 205, 205a are suitably secured between the beams 203, 204 and are spaced inwardly from opposite ends of the beams 203, 204.

The spacing blocks 205, 205a assist in maintaining the beams 203, 204 in sufficiently spaced relation to permit the vertical frame members 25, 25a of the primary carriage 12 to freely pass between the opposite end portions of the beams 203, 204 as best shown in Figures 6, 10, 12 and 14. Opposite ends of the beams 203, 204 are provided with respective sets of guide rollers 206, 207 and 206a, 207a (Figures 2, 3, 4 and 14) which are journaled on suitable brackets 210 carried by the corresponding beams 203, 204. The rollers 206, 207 and 206a, 207a engage the front and rear surfaces of the respective vertically disposed side frame member 25, 25a of the primary carriage 12.

The vertical portion of the secondary carriage 13 is formed, in part, by the beams 203, 204 and spacers 205, 205a. This vertical portion also includes a pair of spaced tie rods or bars 211, 211a whose upper ends are suitably secured to the spacing blocks 205, 205a and whose lower ends are suitably secured to corresponding lower spacing blocks 212, 212a, to opposite sides of which lower front and rear beams 213, 214 are suitably secured. The lower or bottom transverse beams 213, 214 of the auxiliary carriage 13 are also provided with respective pairs of rollers 215, 216 (Figure 6) and 215a, 216a (Figure 2) adjacent opposite ends thereof which are journaled on brackets 217 suitably secured to the lower surfaces of the corresponding beams 213, 214. It will be noted that the vertically disposed frame members 25, 25a of the primary carriage 12 freely pass between opposite end portions of the lower beams 213, 214 of the auxiliary carriage 15 and the rollers 215, 216 engage front and rear surfaces of the frame member 25 while the rollers 215a, 216a engage front and rear surfaces of the vertically disposed frame member 25a of the primary carriage 12.

As heretofore stated, fluid pressure motive means is provided for raising and lowering the primary carriage 12. To this end, it will be observed that the central portions of the lower or bottom beams 213, 214 of the auxiliary carriage 15 support the lower end of a cylinder 220 (Figures 14, 20 and 21). The cylinder 220 has a piston 221 (Figure 20) therein to which a piston rod 223 is connected. Piston rod 223 extends upwardly, penetrates the head of the cylinder 220 and is connected to the upper horizontally disposed frame member 26 of the primary carriage 12.

Means, to be later described, is provided for admitting fluid under pressure into the upper and lower ends of the cylinder 220 to thereby impart downward and upward movement to the primary carriage 12. In order to cushion vertical movement of the primary carriage 12 at the end of each upward and downward stroke thereof, opposite ends of a substantially horizontally disposed cushioning bar 226 (Figure 14) are connected to the respective vertically disposed frame member 25, 25a of the primary carriage 12 adjacent and above the front beam 215 of the auxiliary carriage 13, as by means of brackets 227, 227a. The brackets 227, 227a also have the rollers 30, 30a journaled thereon.

It will be noted that the central portion of the cushioning bar 226 is bowed forwardly and has a cuff member 230 thereon whose upper and lower surfaces are engaged by respective compression springs 231, 232 which loosely encircle a substantially vertically disposed guide rod 233. The lower end of guide rod 233 is fixed in a plate 234 projecting forwardly from the upper and medial portion of the front beam 213 of the auxiliary carriage 13, and the upper portion of the guide rod 233 loosely penetrates a bracket 235 suitably secured to the upper front beam 203 of the auxiliary carriage 13. The lower end of the bottom spring 232 rests against a collar 236 fixed on the shaft or post 233.

It is apparent that, as the primary carriage 12 moves upwardly, the cuff member 231 moves away from the spring 232 and moves the spring 231 upwardly until it engages the lower surface of bracket 235, whereupon spring 231 is compressed to cushion upward movement of the primary carriage 12. The spring 232 functions in the opposite manner; that is, in the course of each downward stroke of the primary carriage 12, the cuff member 231 engages the upper end of spring 232 and compresses the same against the collar 236 to cushion downward movement of the primary carriage 12. The plate 234, which supports the lower end of post 233, is preferably reinforced by horizontal bars 240 to whose lower surfaces the plate 234 is suitably secured, as by welding. The bars 240 extend rearwardly, straddle the lower end of the cylinder 220 and are suitably secured to the upper surfaces of the beams 213, 214 of the auxiliary carriage 13. The lower ends of upright frame members or angle bars 242 are suitably secured to the outer or front portions of the horizontal frame members or bars 240 and extend upwardly adjacent opposite sides of the guide post 233. The upper ends of the bars 242 are suitably secured to the front portions of corresponding bars 244 suitably secured to the upper surfaces of the upper beams 203, 204 of the auxiliary carriage 13.

In order that the piston rod 223 will respond promptly to changes in the direction of flow of fluid pressure through the cylinder 220, the primary carriage 12 is at least partially supported by a weight 250 (Figures 14 and 17), each end of which rests and rides against an inclined guide 251. The lower ends of the guides 251 are suitably secured to the rear lower beam 214 of the secondary carriage 13 (Figure 17) by means of a bracket 251b. Each end of the weight 250 depends from a pliable element shown in the form of a sprocket chain 252 which extends upwardly and over a sprocket wheel 253 and then downwardly between the lower beams 213, 214 of the secondary or auxiliary carriage 13. The lower end of each sprocket chain 252 is connected to the upper end of a rod or shaft 254 whose lower end is connected to the lower horizontal frame member 27 of the primary carriage 12 (Figures 1, 14 and 17). As best shown in Figures 14 and 17, the sprocket wheels 253 are fixed on a shaft 256 whose opposite ends are journaled in bearings 257 suitably secured to corresponding brackets 260 depending from the spacing blocks 205, 205a. The upper ends of the weight guides 251 are suitably secured to the lower ends of the corresponding brackets 260. Thus, the weight guides 251 extend downwardly and rearwardly at an angle to insure that the weight 250 does not swing at the end of the sprocket chains 252 and to insure that it will not engage the forward vertical reaches of the sprocket chains 252.

In order to stabilize the vertical portion of the auxiliary carriage 13, the lower forward ends of a pair of laterally spaced diagonal braces 263 are suitably secured to the lower rear beam 214 of the auxiliary carriage 13 and the upper ends thereof are suitably secured to the rear surfaces of the transverse frame member 202 at the rear end of the auxiliary carriage 13. Now, in order to support the auxiliary carriage 13 and guide the same to prevent lateral movement thereof relative to the main frame 55, a pair of laterally spaced forwardly and rearwardly extending angle bars 270, 270a are suitably secured to the upper surfaces of the upper lateral frame members 60, 63 of the main frame 55 and the rear ends of the stationary frame members 270, 270a are spanned by a rear transverse frame member 271 (Figures 4, 5 and 17). The forwardly and rearwardly extending frame members or angle bars 270, 270a support respective auxiliary carriage tracks 273, 273a (Figures 1, 4, 5, 6, 7, 10, 12, 13, 14 and 17).

It will be noted that the auxiliary carriage tracks 273, 273a are disposed closely adjacent the distal surfaces of the forwardly and rearwardly extending frame members 200, 200a in the upper portion of the auxiliary carriage 13 and opposite ends of the forwardly and rearwardly frame members 200, 200a are each provided with a pair of rollers 274, 275. Opposite ends of frame members 271 are fixed to the rear ends of the tracks 273, 273a. The rollers 274 ride against the inner surfaces of the auxiliary carriage tracks 273, 273a and the rollers 275 ride upon the tracks 273, 273a and support the auxiliary carriage 13 for forward and rearward movement thereon.

The frame members 270, 270a are parts of the main frame 55 and have respective built-up substantially U-shaped primary track supports 277, 277a depending therefrom (Figures 6 and 17, respectively). The primary carriage tracks 32, 32a are suitably secured to the inner or proximal surfaces of the substantially U-shaped supports 277, 277a. Bearing blocks 280, 280a (Figures 6 and 14) are suitably secured to and depend from the auxiliary carriage track supports 270, 270a, respectively, adjacent the forward legs of the respective primary carriage track supports 277, 277a and each of the bearing blocks 280, 280a has a substantially horizontal pivot shaft 281 journaled therein. The upper portion of the keeper cams or latches 31, 31a are fixed to the corresponding shafts 281. One of the shafts 281 (the shaft 281 associated with the keeper cam or latch 31, in this instance) has a switch-engaging arm 282 projecting laterally therefrom which, upon movement of the latch or keeper cam 31 in a clockwise direction in Figures 6 and 20, imparts movement to a spring loaded arm 283 of a normally open switch 284 to close the same. The switch 284 serves to reverse the flow of fluid pressure through the cylinder 220 so the primary carriage 12 moves downwardly upon the primary and auxiliary carriages 12 and 13 reaching the end of each successive forward stroke, as will be more fully described hereinafter.

As best shown in Figure 7, the carriage lowering switch 284 is supported on and depends from an angle bracket 285 whose vertical portion is suitably secured to the outer surface of the angle bar 270. A normally open carriage-raising switch 286 is spaced inwardly from the carriage-lowering switch 284 and depends from an arm 287 which projects upwardly and is suitably secured to the lower surface of the angle bar 270. The normally open carriage-raising switch 286 is also provided with an actuating arm 290, similar to the actuating arm 283 of the carriage-lowering switch 284. The arm 290 is adapted to be engaged, and moved to closed position, by an inverted L-shaped switch engaging arm 291 which is movable with the primary carriage 12.

In this instance, the lower end of the switch engaging arm 291 is suitably secured to the cushioning bar 226 adjacent that end thereof which is connected to the vertically disposed frame member 25 of the primary carriage member 12. It should be noted that the upper end or leg of the inverted L-shaped switch engaging arm or member 291 closes the carriage-raising switch 286 as the primary carriage 12 reaches the end of each successive downward stroke thereof to cause fluid pressure to enter the lower end of cylinder 220 and thereby initiate upward movement of the primary carriage 12, as will be more fully described hereinafter. In order to maintain each of the keeper cams or latches 31, 31a against the front ends of the respective primary carriage tracks 32, 32a, each of the latches 31, 31a has a forwardly projecting arm 293 thereon, on the forward end of which a suitable weight means 294 is mounted. The forward leg of the primary carriage track support 277 also has a plate 295 extending forwardly and downwardly therefrom to which a normally closed clutch control switch 296 is suitably secured (Figures 7, 8 and 10). The switch 296 has a spring-loaded shaft 300 projecting therefrom which is normally urged to open position and which has a lateral arm 301 thereon disposed in the vertical plane of a switch-closing abutment 302 projecting from the outer surface of a rotatable disk 303. The disk 303 is fixed on a shaft 304 projecting from the four-way valve 187 and this shaft 304 rotates the core of the valve 187 between the positions shown in Figures 9 and 11 as such movement is imparted to the disk 303 by means to be later described.

The housing of the valve 304 is fixed to the outer surface of a plate 306 depending from bracket 227 carried by the vertical frame member 25 of the primary carriage 12. The bracket 227 serves to connect the cushioning bar 226 and the roller 30 to the vertical leg 25 of the primary carriage 12. It will be noted that the inner surface of the disk 303 also has an abutment 310 thereon (Figure 8) which is circularly spaced from abutment 302. Each of the abutments 302, 310 may be in the form of a roller, pin or projection carried by the disk 303.

The abutments 302, 310 are alternately engageable by respective valve control stop elements 312, 313 (Figures 7 and 10). The valve control stop element 312 is shown in the lower portion of Figures 6 and 7 in the form of a screw whose lower end is fixed or threaded into an arm 315 which extends inwardly and is suitably secured to the front lower beam 213 of the auxiliary carriage 13. Since the valve 187 and plate 306 move vertically relative to the bar 315 and the valve control element 312, the bar 315 is cut away, as at 316, in order to clear the lower portion of the housing of the valve 187 and the plate 306. The valve control element 313 may be in the form of a roller or bolt and is shown in the form of a bolt in the right-hand portion of Figures 6, 11 and 12 which is horizontally adjustable in a slot 320 provided in the lower portion of a plate 321 suitably secured to the rear vertical leg of the substantially U-shaped primary carriage track support 277.

*Means for shifting carriages forwardly and rearwardly*

The positions of the lower surfaces of the keeper cams or latches 31, 31a and the switch arm 301 of switch 300 relative to the upper surfaces of the rollers 30, 30a and the projection or abutment 302 on the outer face of the disk 303, when the disk 303 occupies substantially the position shown in Figure 7, are such that the roller 30 engages the lower surface of the keeper cam 31 as the abutment 302 raises the switch arm 301 to momentarily close the switch 296. As the switch 296 is closed, this initiates a reciprocatory movement to the primary auxiliary carriages 12, 13. To this end, each time the switch 296 is closed, current flows through a solenoid coil 325 which causes a solenoid plunger 326 (Figures 5 and 20) to move downwardly from a normally raised position to move a trip bar 327 out of engagement with a shoulder 330 formed on a cam plate 331 of a single revolution clutch broadly designated at 332. The single revolution clutch 332 may be of the same construction as the single revolution clutch mechanism 91 (Figures 15, 16 and 19) and, accordingly, a further detailed description thereof will not be given in order to avoid repetitive description.

The trip bar 327 is normally urged against the periphery of cam plate 331 by a tension spring 334, one end of which is connected to the solenoid plunger 326 and the other end of which is connected to a bracket 335 which extends downwardly and has the solenoid coil 325 attached thereto. The bracket 335 is a part of the housing for the solenoid coil 325 and is suitably secured to the rear transverse frame member 271 of the main frame 55 (Figure 5).

The single revolution clutch mechanism 332 is provided with a pulley 338 and the mechanism 332 with its pulley 338 are mounted on a shaft 339. The shaft 339 is journaled in a bearing block 340 mounted on uprising rear portions of a pair of reciprocating drive unit support brackets 341, 342. The rear lower ends of the brackets 341, 342 are suitably secured to the upper surface of the rear transverse frame member 271 and the front ends of the brackets 341, 342 are suitably secured to the transverse frame member 63. It should be noted that the forward portions of the brackets 341, 342 overlie the rear transverse frame member 202 of the auxiliary carriage 13, but do not engage the same, since the forward ends of the brackets 341, 342 extend downwardly and forwardly of the transverse frame member 202 are suitably secured to the frame member 63 (Figures 4 and 5).

The pulley 338 is engaged by an endless belt 343 which extends downwardly and forwardly and also engages a pulley 344. The pulley 344 is fixed on a shaft of a gear reduction or speed reducing unit 345 fixed on a motor support plate 346 suitably secured to the forward portion of the brackets 341, 342. The plate 346 also has a constantly energized electric motor 347 fixed thereon and the motor 347 is connected with the speed reducing unit 345 by means of pulleys 350, 351 and an endless belt 352. The pulleys 350, 351 are mounted on the shaft of the motor 347 and the speed reducing unit 345, respectively. The shaft of the speed reducing unit has a pulley 353 fixed thereon on which an endless belt 354 is mounted.

The belt 354 is also entrained over a pulley 355 which is fixed on the shaft of a vacuum or suction pump 356. Thus, the suction pump 356 and the pulley 338 are driven continuously. The suction pump 356 is connected to a sealed vacuum tank 357 (Figures 1, 3, 4 and 20) by means of a conduit or pipe 360. The vacuum tank 357 has a flexible pipe or conduit 361 leading therefrom to the four-way valve 187 and the tank 357 serves to insure that compressed air is quickly exhausted from the article-engaging members 10 as the bottles B or other containers are positioned upon the discharge conveyor 14, as will be more fully described hereinafter. The tank 357 is supported on standards 361 whose lower ends are fixed to the frame member 63 of the main frame 55.

In order to prevent inadvertent rotation of shaft 339, the shaft 339 has a brake drum 365 fixed thereon (Figure 5) which is engaged by a substantially C-shaped brake or friction band 366 whose ends are held in proper relationship by a bolt 367. A portion of the brake band 366 opposite from the bolt 367 has one end of a retaining member 370 attached thereto and extending outwardly therefrom and having its other end connected to the uprising portion of the bracket 341.

One end of the shaft 339 has a crank 371 fixed thereon which has a pin or stub shaft 372 connected to one end of an elongated tubular member 373 by means of a bearing block 374 depending from the rear end of the elongated tubular member 373 (Figures 2, 3, 4, 5 and 21). The tubular member 373 is a part of a composite link broadly designated at 375 which also includes a bar or rod 376 which extends longitudinally of and is loosely mounted in the tubular member 373. The forward end of the bar 376 is pivotally connected, as at 377 (Figure 5), to the upper rear beam 204 of the auxiliary carriage 13.

In Figure 23 there is shown a releasable safety locking device for locking the bar 376 in engagement with the tubular member 373. The safety locking device comprises a channel-shaped lever 380, one end of which is pivotally connected to the lower surface of the tubular member 373 and whose medial portion is provided with a pair of spaced ears 381 which straddle the tubular member 373 and have a locking pin 382 fixed therebetween which is normally biased into locking engagement with a groove or notch 384 formed in the lower surface of the bar 376, by means of a tension spring 385. The lower end of tension spring 385 is connected to the lever 380 and its upper end is connected to a spring anchor 386 which extends downwardly and is suitably secured to the upper surface of the tubular member 373 of the composite link 375.

From the foregoing, it is apparent that, upon any obstruction preventing movement of the carriages 12, 13 with the link 375, the pin 382 will be forced out of its groove 384 and, thus, the tubular member 373 may move longitudinally of the bar 376 to avoid injury to the various interconnected parts driven by the shaft 339 when the shoulder 330 of the single revolution clutch mechanism 332 is not engaged by the trip bar 327.

The shoulder 330 on the cam plate 331 of the single revolution clutch mechanism 332 is so positioned that the primary and secondary carriages 12, 13 occupy their foremost positions when the shaft 339 is at rest. It is apparent, therefore, that upward movement of the primary carriage 12, with consequent movement of the pin 302 (Figures 6, 7 and 8) upwardly against the switch actuating arm 301, momentarily closes the switch 296 to energize solenoid coil 325 (Figures 5 and 20) to release shoulder 330, on the plate 331 of the single revolution clutch mechanism 332, from the trip bar 327. Thereupon, a rearward stroke and then a forward stroke are imparted to the primary carriage 12 and the secondary carriage 13 by the shaft 339 and intervening connections to the secondary or auxiliary carriage 13. The switch 296 is only closed momentarily because of the rearward movement imparted to the carriages 12, 13, immediately following the closing of the switch 296.

It is apparent that the speed of rotation of the shaft 339 of the carriage reciprocating apparatus is in such ratio to the surface speed of the discharge conveyor 14 that the carriages 12, 13 are moved rearwardly at substantially the same speed as that of the conveyor 14. Also, the speed of the article positioning conveyor 23 is necessarily sufficient to insure that a case of empty containers or bottles is moved into position beneath the right-hand group of article-engaging members 10 (Figure 1) with each forward and each rearward stroke of the carriages 12, 13 as effected by each complete revolution of the shaft 339. The means for effecting two revolutions of the shaft 90 of the article-positioning conveyor 23 with each single revolution of the shaft 339 associated with the carriage reciprocating apparatus will now be given with the description of the piping and wiring circuits.

*Electrical and fluid pressure circuits*

The fluid pressure circiut is best shown in Figure 20 in the form of a pneumatic or compressed air system. However, it is to be distinctly understood that the machine may be readily adapted to any form of fluid passage circuit by anyone skilled in the art without departing from the spirit of the invention.

It has already been described how the four-way valve 187 has the conduits 184, 361 connected thereto. A flexible conduit 390 is also connected to the four-way valve 187 and leads to a conduit 391 extending from a suitable source of compressed air 392. The conduit 391 also has one end of a flexible conduit 393 connected thereto which leads to an electrically operable four-way valve assembly broadly designated at 394 (Figures 20 and 24). The housing of valve assembly 394 has a pair of passageways a, b therein with which the conduit 393 communicates and the opposite side of the housing has a pair of conduits 395, 396 connected thereto. A valve core 397 is slidably mounted in the housing of valve mechanism 394 and is provided with spaced ports c, d, e therein.

When the core 397 is in the position shown in Figure 24, the port c establishes communication between the passageway a and the conduit 395 while the passageway d establishes communication between the conduit 396 and a vent passageway f formed in the housing of valve mechanism 394. On the other hand, when the core 397 is shifted to the left in Figure 24, the port c establishes communication between passageway b and conduit 396 while the port e establishes communication between conduit 395 and the vent passageway f. The valve core 397 has solenoids 400, 401 operatively associated with opposite ends thereof. The four-way valve mechanism 394 is shown suitably mounted on the bottom beams 213, 214 of the secondary carriage 13 in Figures 1, 20 and 21.

Electrical conductors or wires 402, 403 and 405, 406 are connected to opposite ends of the coils of the respective solenoids 400, 401 and the conductor 402 leads to one side of the normally open carriage-raising switch 286. The other side of switch 286 has a conductor 407 leading therefrom to a lead wire 410 which leads from a plug 411 adapted to be connected to a suitable source of electrical energy, not shown. Plug 411 also has a conductor 412 leading therefrom in which a manual master switch 414 is interposed. The conductor 406 leads from one end of the coil of solenoid 401 to the lead wire or conductor 412. The end of conductor 405 remote from the coil of solenoid 401 is connected to one side of the normally open carriage lowering switch 284 and the end of the lead wire 410 remote from the plug 411 is connected to the other side of the normally open switch 284.

It is thus seen that, when the primary carriage-raising switch 286 is closed, the coil of solenoid 400 is energized to cause the core 397 of the four-way valve mechanism 394 to occupy the position shown in Figure 24. Now, the pipe or conduit 395 leads to the bottom of the cylinder 220 and the pipe 396 leads to the top of the cylinder 220 so that compressed air then flows into the lower end of the cylinder 220 to raise the primary carriage 12. Although the switch 286 is then opened, it is apparent that the core 397 will remain in the position to which it was moved due to energization of the coil of solenoid 400.

On the other hand, when the latch or keeper cam 31 is swung to the left in Figure 20, or from the position shown in Figure 6 to substantially the position shown in Figure 13, it is apparent that the switch 284 is closed by the arm 282. This momentarily energizes the coil of solenoid 401 to shift the core 397 of the valve mechanism 394 to the left in Figure 24 so that compressed air can enter the upper end of the cylinder 220 while it is exhausted from the lower end of the cylinder through the pipe or conduit 395, port e in the core 397 of the valve mechanism 394 and vent passageway f.

The ends of conductors 111, 112 remote from the case-positioner motor 106 are connected to the respective lead wires or conductors 410, 412. The lead wires or conductors 410, 412 also have corresponding ends of respective conductors 416, 417 connected thereto which lead to opposite sides of the carriagee-reciprocating or shifting electric motor 347. It is thus seen that, upon the master switch 413 being closed, both of the motors 106, 347 are energized. The carriage reciprocating control switch 296 has conductors 420, 421 connected to opposite sides thereof, the conductor 421 leading from the conductor 416. The conductor 420 leads to one side of the solenoid coil 325 which controls the trip bar 327. The other end of the coil 325 has a conductor 422 leading therefrom to the conductor 417.

As heretofore stated, it is necessary that the compressed air be rapidly exhausted from the article engaging members 10 as articles are deposited upon the conveyor 14. Thus, the pneumatic delay-relay 185 is provided and is shown more in detail in Figure 22 wherein it will be observed that the delay-relay 185 comprises a cylinder 425 whose lower end has a pipe or conduit 424 leading therefrom and communicating with the conduits 184, 186. The upper end of the cylinder 425 is provided with an exhaust port q therein. Mounted for axial movement in the cylinder 425 is a piston 426 having a piston rod 427 extending upwardly therefrom.

The upper end of piston rod 427 is pivotally connected to a medial portion of a lever 430 having a mercury switch 431 mounted thereon and movable therewith. One end of the lever 430 is pivotally connected to a fixed part of the delay-relay 185 and the other end thereof is normally biased or urged downwardly by a tension spring 433 whose upper end is connected to the lever 430 and whose lower end is also connected to a fixed part of the delay-relay at 434. When the piston 426 is in fully raised or active position, the mercury in the switch 431 establishes contact between the conductor 403 and a conductor 436. As heretofore stated, the connductor 403 is connected to one side of the coil of the solenoid 400. The end of the conductor 436 remote from the mercury switch 431 is connected to the conductor 416.

Since line pressure in the conduit 391 may vary or be greater than that desired in either of the conduits 390, 393, and it may also be desirable to permit a lesser amount of fluid pressure to enter the pressure-actuated article-engaging members 10 than is admitted into either end of the cylinder 220, it is preferable that suitable regulator valves 440, 441 are interposed in the respective conduits 390, 393 substantially as shown in Figure 20.

In order to control operation of the case-positioner conveyor 15 in proper timed relation to operation of the carriages 12, 13, it will be observed in Figures 3, 4, 5 and 20 that the shaft 339 of the carriage reciprocating apparatus also has a valve controlling cam wheel 445 fixed thereon which is provided with a pair of substantially diametrically opposed projections or lobes L, L' which are adapted to alternately engage a follower h on the free end of a valve control lever k pivoted on the housing of a three-way valve mechanism 446. It will be observed in Figure 5 that the valve mechanism 446 is suitably supported on the bracket 341. The valve mechanism 446 may be of any desired or well-known construction and a detailed description thereof is deemed unnecessary, it being deemed sufficient to state that the valve 446 is provided with an upwardly biased plunger 447 and has the conduit 391 connected to one side thereof and the conduit 143 connected to the other side thereof. As heretofore stated, the conduit 143 is connected to the cylinder 137 associated with the case-positioner 23 (Figures 15, 16, 18 and 20). The valve mechanism 446 may be of the usual type which, upon the plunger 447 being depressed, will establish communication between the conduits 391, 143 and, upon the plunger 447 being released, compressed air will be exhausted from the conduit 143.

Method of operation

Since the cycles in the operation of the improved bottle case unloader are repeated without interruption, it is apparent that a cycle may be initiated with the various movable elements of the machine in any of the positions they occupy at any time throughout the course of movement thereof. Accordingly, for purpose of description, it shall be assumed that a cycle of the machine is initiated as the abutment, pin or projection 302 on the valve-controlling disk 312 moves into engagement with the arm or crank 301 (Figures 6, 7 and 8) and closes switch 296. At this time, the relative attitude of the pins or projections 302, 310 is substantially as shown in Figures 6 and 8 and the core of the valve 187 occupies the position shown in Figures 9 and 20. Of course, the master switch 413 will have been closed and the motors 106, 347 are running. It will be noted that when the core of the valve 187 occupies the position in which it is shown in Figures 9 and 20, the end of the conduit 361 opposite from the vacuum tank 357 is closed so the vacuum pump 356 is then creating a vacuum or negative pressure in the tank 357.

As heretofore stated, as the pin or abutment 302 on disk 303 closes the switch 296, the solenoid coil 325 (Figures 5 and 20) is energized to move the trip bar 327 out of engagement with the shoulder 330 on the cam plate 331 of the single revolution clutch mechanism 332 whereupon a revolution is imparted to the shaft 339. At this time, the core 397 of valve mechanism 394 occupies the position shown in Figure 24 and, as the switch 296 is closed by the pin 302 on the disk 303, the rollers 30, 30a are engaging the lower surfaces of the latches or keeper cams 31, 31a. As heretofore stated, the keeper cams 31, 31a are so positioned that the piston 221 in cylinder 220 will not have reached the limit of its upward movement so the rollers 30, 30a bear upwardly against the lower surfaces of the keeper cams 31, 31a under resilient pressure.

Since the lower surfaces of the keeper cams 31, 31a are in alinement with the lower surfaces of the respective primary carriage tracks 32, 32a (Figures 6, 7, 10, 12, 13, 14 and 17), it is apparent that the rollers 30, 30a subsequently ride in resilient engagement with the lower surfaces of the primary carriage tracks 32. In the course of rearward movement of the primary and secondary carriages 12, 13 to, say, the position shown in Figure 10, the lobe L on the cam wheel 445 engages follower h and opens the valve 446 to admit fluid pressure from the source 392 into the cylinder 137 (Figures 1, 3, 15, 16, 18 and 20).

Assuming that there is a case C of containers or bottles B then in engagement with the stop member 20 of the case-positioner 15, the introduction of compressed air into cylinder 137 causes the piston 140 and piston rod 136 to move outwardly or rearwardly to cause the case-deflector arm 126 to move the corresponding case inwardly so it is alined with the side guides 150, 151. This also causes the trip bar 100 to move out of engagement with the shoulder 97 on the cam plate 92 of the single revolution clutch mechanism 91. Thus, the case last moved inwardly by the deflector bar 126 is advanced by the friction rollers 75, 76 (Figures 15, 16 and 18) and the rolls or drums 147 on shaft 72 so the next succeeding flight bar 22 engages the corresponding case and advances the same to a position beneath the first or right-hand group of article-engaging members 10 shown in Figure 1.

At substantially the time that the latter case is advanced in the manner last described, the rollers 30, 30a move into engagement with the downwardly and rearwardly inclined cam portions 33, on the rear ends of the tracks 32, 32a to thereby force the primary carriage 12 downwardly in opposition to the pneumatic pressure. Just about the time that the latter downward movement is imparted to the primary carriage 12, the pin 302 on the valve controlling disk 303 engages the abutment or valve actuating element 313 (Figure 10) which is so positioned that further downward and rearward angular movement of the primary carriage 12 causes the pin or actuating element 313 to impart a quarter revolution to the disk 303 and, consequently, the core of the valve 187 so it then occupies the position shown in Figure 11.

It is apparent that the negative pressure in the vacuum tank 357 thus induces a rapid or sudden exhaustion of air from the chambers 180 and the pressure-actuating article-engaging members 10 to thereby insure that the bottles or other containers are quickly released from the article-engaging or grasping members 10 as the articles are deposited upon the conveyor 14. At substantially the same time that the core of the four-way valve 187 is moved to the position shown in Figure 11, the rollers 30, 30a move rearwardly beyond the rear edges of the inclined cam portions 33 of the tracks 32, 32a and, since the compressed air under pressure is still being applied in the lower end of the cylinder 220, the primary carriage 12 is caused to dart upwardly so that, as the composite link 375 commences its return or forward stroke, the rollers 30, 30a are then disposed above the levels of the respective tracks 32, 32a.

In the course of each successive return stroke or forward stroke of the carriages 12, 13, the lobe L' on the cam 445 again momentarily closes the valve mechanism 446 to effect another cycle in operation of the case-positioner 15 to move the case C, which was previously positioned below or in the plane of the right-hand group of article-engaging members 10, into the plane of the left-hand group and to, simultaneously, position a succeeding case C in the plane of the right-hand group of article-engaging members 10. It is apparent that any previously emptied cases C on the track bars 42 of the case-positioner 15 will have been pushed off the track bars 42 and advanced upon the rollers 170 and thus discharged along the discharge roller conveyor 171.

As the primary and secondary carriages 12, 13 move forwardly, the rollers 30, 30a thereon engage the rear surfaces of the respective latches or keeper cams 31, 31a to swing the same forwardly away from the front edges of the respective tracks 32, 32a as shown in Figure 13. In so doing, the arm 282 on the shaft 281 from which the latch 31 depends (Figures 7, 8 and 20) momentarily closes the switch 284 to energize the coil of solenoid 401 associated with the four-way valve mechanism 394 (Figures 20 and 24). This causes compressed air to flow into the upper end of the cylinder 220 as it is discharged from the lower end thereof to impart downward movement to the primary carriage 12. It is apparent that, as the latches or keeper cams 31, 31a are swung forwardly by the rollers 30, 30a, the trip bar 327 will have again engaged the shoulder 330 of the single revolution clutch mechanism 332 to thereby stop rotation of the shaft 339.

As such downward movement of the primary carriage 12 is initiated, the disk 303 will still occupy the position shown in Figure 13 and, of course, the core of valve 186 will then still occupy the position shown in Figure 11. Thus, the carriage 12 is lowered until the article-engaging members 10 again engage the upper ends of the corresponding bottles or containers B in the cases C therebeneath. At the same time that the article-engaging members 10 engage the bottles or containers B then in cases positioned on the track bars 42 of the case-positioner 15, the pin or abutment 310 on the inner surface of the disk 303 engages the upwardly projecting valve actuating member 312 to rotate the disk 303 from the position shown in Figure 13 to that shown in Figures 6, 7 and 8. It is apparent that this again returns the core of the valve 187 to the position shown in Figures 9 and 20.

Also, at substantially the same time that the article-engaging members 10 engage the bottles or other containers B in the manner as described, the forwardly projecting portion on the upper end of the switch engaging bar 291 closes the switch 286. As shown in Figure 20, when the switch 286 is closed, it establishes contact between conductors 402, 407. However, this will not immediately cause energization of the coil of solenoid 400 because the mercury switch 431 of the pneumatic delay-relay mechanism 185 (Figure 22) will then be open. Since the core of the valve 187 then occupies the position shown in Figures 9 and 20, it is apparent that compressed air is introduced into the pressure-actuated article-engaging members 10.

The pneumatic delay-relay 185 is provided to insure that the pressure in the article-engaging members 10 is adequate to insure that the article engaging members tightly engage or grasp the corresponding bottles or other containers B. To this end, as the pressure in the article-engaging members 10 increases to the desired sufficiency, the pressure in the conduit 184 increases and this also increases the pressure in the cylinder 425 and causes the piston 426, the piston rod 427 and the lever 430 (Figures 20 and 22) to move upwardly to the position shown in Figure 2. This closes the mercury switch 431 and, since the switch 431 is in series with the previously closed switch 286 and the coil of solenoid 400, it is apparent that the solenoid 400 is then energized to cause the core of the four-way valve 394 to move from left to right in Figure 24 to introduce fluid pressure into the lower end of the cylinder 220 as it is exhausted from the upper end thereof and to thereby initiate upward movement of the primary carriage 12.

It is apparent that compressed air was previously exhausted from the cylinder 425 in the pneumatic delay-relay 185 when the core of the four-way valve 187 was rotated to the position shown in Figure 11 for releasing the bottles or other containers B from the article-engaging members 10, so the spring 433 had opened the switch 431.

In the drawings and specification there has been set forth a preferred embodiment of the invention and, although specific terms are employed, they are used in a generic and descriptive sense only and not for purposes of limitation, the scope of the invention being defined in the claims.

I claim:

1. In an article handling machine having a carriage, article-engaging members depending from the carriage and a continuously driven rearwardly moving and substantially horizontal conveyor; in combination, track means spaced above and extending substantially parallel to said conveyor, track-engaging means on said carriage, means for, at times, resiliently urging said carriage upwardly and urging said track-engaging means against the lower surface of said track means, downwardly inclined cam means on the rear end of said track means, means to reciprocate said carriage forwardly and rearwardly sufficient to move the track-engaging means beyond opposite ends of said track means whereby the carriage is lowered by engagement of the track-engaging means with said cam means, means to release articles from the article-engaging members when they are lowered by the cam means whereby the carriage and said track-engaging means are caused to dart upwardly by said means resiliently urging the carriage upwardly as the track-engaging means moves beyond the rear end of said cam means, said means resiliently urging the carriage upwardly causing said track-engaging means to then move above the level of said track means, said means resiliently urging said carriage upwardly also being operable to lower said carriage and to aline the upper surface of said track-engaging means with the lower surface of said track means at the end of each forward stroke of the carriage, and means to connect articles with said article-engaging members while the carriage is in forward position.

2. In an article handling machine having a carriage, article-engaging members depending from the carriage and a continuously driven rearwardly moving and substantially horizontal conveyor; in combination, a pair of spaced tracks spaced above and extending substantially parallel to said conveyor, track-engaging means on said carriage, means to reciprocate said carriage forwardly and rearwardly sufficiently to move the track-engaging means beyond opposite ends of said tracks, motive means for resiliently raising and lowering said carriage, said motive means being operable to resiliently urge said carriage upwardly and urge said track-engaging means against the lower surfaces of said tracks with rearward movement of said carriage, downwardly inclined cam means on the rear end of each track whereby the carriage is lowered by engagement of the track-engaging means with said cam means, means to release articles from the article-engaging members when they are lowered by the cam means whereby the carriage and said track-engaging means are caused to dart upwardly by said motive means as the track-engaging means move beyond the rear ends of said cam means, said motive means causing said track-engaging means to then move above the level of said tracks, said motive means being operable to lower said carriage and aline the upper surfaces of said track-engaging means with the lower surfaces of said tracks at the end of each forward stroke of the carriage, and means to connect articles with said article-engaging members while the carriage is in forward position.

3. In an article handling machine having a carriage, article-engaging members depending from the carriage and a continuously driven rearwardly moving and substantially horizontal conveyor; in combination, tracks spaced above and extending substantially parallel to said conveyor, track-engaging means on said carriage, fluid-pressure-operated means for raising and lowering said carriage and thereby resiliently urging said carriage upwardly and urging said track-engaging means against the lower surfaces of said tracks, downwardly inclined cam means on the rear ends of said tracks, means to reciprocate said carriage forwardly and rearwardly sufficient to move the track-engaging means beyond opposite ends of said tracks whereby the carriage is lowered by engagement of the track-engaging means with said cam means, means to release articles from the article-engaging members when they are lowered by the cam means whereby the carriage and said track-engaging means are caused to dart upwardly by said fluid-pressure-operated means as the track-engaging means move beyond the rear end of said cam means, said fluid-pressure-operated means causing said track-engaging means to then move above the level of said tracks, means operable automatically upon said carriage moving forwardly to reverse the flow of pressure to said fluid-pressure-operated means to lower said carriage, means to connect articles with said article-engaging members while the carriage is in lowered forward position and means to aline the upper surfaces of said track-engaging means with the lower surfaces of said track as the carriage is raised, 4. A structure according to claim 3 wherein said article-engaging members are of the pressure-actuated type, means for admitting fluid pressure to the article-engaging members at the end of each downward stroke of said carriage while in forward position, a vacuum tank, means to create negative pressure in said vacuum tank, and means operable automatically in the course of each downward movement of the carriage, as effected by engagement of the track-engaging means with the cam means on said tracks, for establishing communication between the pressure-actuated article-engaging members and said vacuum tank to thereby quickly exhaust the pressure from said article-engaging members.

5. In an article-handling machine having a continuously driven conveyor and means for successively positioning group of articles forwardly of said conveyor, a carriage having article-engaging members thereon adapted to engage each successive group of articles forwardly of said conveyor and means for then imparting a rearward and then a forward stroke to said carriage; the combination of means for controlling said carriage in the course of successive rearward and forward strokes thereof including a pair of substantially horizontal tracks spaced above said conveyor, follower means on opposite sides of said carriage and being engageable with the lower surfaces of said tracks during each successive rearward stroke of said carriage, motive means resiliently urging said carriage upwardly as the followers engage the lower surfaces of the respective tracks, a downwardly and rearwardly inclined cam portion on the rear end of each track for forcing the carriage downwardly at the end of each rearward stroke thereof to deposit the articles upon the conveyor, means to then release the articles from the article-engaging members, and said motive means causing the carriage to dart upwardly as the followers move rearwardly past the respective cam portions to thereby raise the article-engaging members away from said articles as they are deposited on said conveyor whereby the followers pass above said tracks in the course of each successive forward stroke of said carriage.

6. In an article-handling machine having a continuously driven conveyor and means for successively positioning groups of articles forwardly of and on a lower level than said conveyor, a carriage having article-engaging members thereon adapted to engage and lift each successive group of articles to a level above said conveyor and means for then imparting a rearward and then a forward stroke to said carriage; the combination of means for controlling said carriage in the course of each successive forward and rearward stroke thereof including a pair of substantially horizontal tracks spaced above said conveyor, follower means on opposite sides of said carriage and being engageable with the lower surfaces of said tracks upon each successive upward stroke of said carriage, means resiliently urging said carriage upwardly as the followers engage the lower surfaces of the respective tracks whereby the followers ride against the lower surfaces of said tracks in the course of each successive rearward stroke of the carriage, a downwardly and rearwardly inclined cam portion on the rear end of each track for forcing the carriage downwardly at the end of each rearward stroke thereof to deposit articles upon the conveyor, means to then release the articles from the article-engaging members, and said means resiliently urging said carriage upwardly causing the carriage to dart upwardly as the followers move rearwardly past the respective cam portions to thereby raise the article-engaging members away from said articles as they are deposited on said conveyor whereby the followers pass above said tracks in the course of each forward stroke of said carriage.

7. In a case unloading machine having a carriage, article-engaging members depending from the carriage, a continuously driven conveyor and a case unloading zone forwardly of the conveyor; the combination of yieldable means to raise said carriage under yieldable pressure and to also lower said carriage at said zone, substantially horizontal carriage guide means spaced above said zone and overlying said conveyor, guide-engaging means on the carriage, movable keeper means normally positioned to be engaged by said guide-engaging means in the course of each upward stroke of the carriage and arranged to aline the upper surface of the guide-engaging means with the lower surface of said carriage guide means, means to shift said carriage rearwardly over said conveyor and then forwardly above said zone, downwardly and rearwardly inclined cam means on the rear end of said carriage guide means for lowering the carriage at the end of each rearward movement thereof to lower the articles toward the conveyor, means to release the articles from said article-engaging members as they move toward said conveyor, said yieldable means causing the carriage to dart upwardly as the guide-engaging means moves rearwardly beyond said cam means, the keeper means being movable by said guide-engaging means away from the forward end of said carriage guide means to permit the guide-engaging means to pass thereby at the end of each forward movement of, and at the beginning of each downward stroke of, the carriage.

8. In a case-unloading machine having a carriage, at least two spaced groups of article-engaging members depending from the carriage and a constantly driven first conveyor; the combination of a case-positioner disposed forwardly of said conveyor, intermittently driven second conveyor means in said case-positioner, said second conveyor means including means for engaging and imparting predetermined movement to a case of prearranged articles with each movement thereof, motive means to lower said carriage from a raised position after a number of cases corresponding to the number of groups of article-engaging members have been moved to a position in substantial alinement therewith for engagement of articles therein by the article-engaging members, means controlling said motive means to then impart an upward stroke to the carriage under yieldable pressure, a pair of followers projecting outwardly on opposite sides of said carriage, a pair of substantially horizontal tracks overlying said first conveyor and having their forward ends terminating rearwardly of the vertical plane of said followers in the course of each vertical movement thereof, a pair of pivoted keeper cams normally resting against the front ends of said tracks and having their lower surfaces disposed on substantially the same level as said tracks and being yieldably engageable by the followers in the course of each upward stroke of said carriage, means operable automatically to then impart a rearward stroke to said carriage, said tracks being so arranged that the lower ends of said articles are spaced above said first conveyor in the course of each successive rearward stroke of said carriage, a rearwardly and downwardly inclined cam portion on the rear end of each track, whereby said followers move the carriage downwardly against said yieldable pressure at the end of each rearward stroke of said carriage, means to release the articles from said article-engaging members as the carriage is lowered above said first conveyor to deposit the articles upon said first conveyor, said motive means serving to impart sudden upward movement to the carriage as the followers move rearwardly beyond the respective cam portions whereby, with each successive forward stroke of the carriage by said motive means, the followers move above the respective tracks, and said followers being adapted to engage and swing said keeper cams forwardly at the termination of each forward stroke of said carriage to permit a subsequent downward stroke to be imparted to said carriage.

9. A structure according to claim 8 including means responsive to each successive rearward stroke of said carriage while in raised position for imparting a step in movement to the second conveyor means, and means responsive to each forward stroke of said carriage while in raised position for imparting another step to said second conveyor means.

10. A structure according to claim 8 including means responsive to movement of said keeper cams, caused by engagement thereby with said followers at the end of each forward stroke of said carriage, for rendering said motive means operable to effect a downward stroke to said carriage.

11. A structure according to claim 8 including means to impart a predetermined number of steps to the second conveyor means during movement of said followers in engagement with said tracks.

12. A structure according to claim 8 wherein said article-engaging members are of the pressure-actuated type, means for admitting fluid pressure to the article-engaging members at the end of each downward stroke of said carriage, a vacuum tank, means to normally create negative pressure in said vacuum tank, and means operable automatically in the course of each downward movement of the carriage, as effected by engagement of the followers with the cam portions on said tracks, for establishing communication between the pressure-actuated article-engaging members and said vacuum tank to thereby quickly exhaust the pressure from said article-engaging members.

13. In a case-unloading machine having a carriage, at least one group of article-engaging members depending from the carriage, a constantly driven conveyor and means to position cases of articles forwardly of said conveyor, the combination of motive means to raise and lower said carriage under yieldable pressure, means to actuate said motive means to lower said carriage from a raised position to move the article-engaging members into engagement with articles therebeneath, means to then activate said motive means to impart an upward stroke to the carriage under yieldable pressure, a pair of followers projecting outwardly on opposite sides of said carriage, a pair of substantially horizontal tracks overlying said conveyor and having their forward ends terminating rearwardly of the vertical plane of said followers in the course of each vertical movement thereof, a pair of pivoted keeper cams normally resting against the front ends of said tracks and having their lower surfaces disposed on substantially the same level as the lower surfaces of said tracks and being yieldably engageable by the followers in the course of each upward stroke of said carriage, means operable automatically to then impart a rearward stroke and then a forward stroke to said carriage, said tracks being so arranged that the lower ends of said articles are spaced above said conveyor in the course of each successive rearward stroke of said carriage, a rearwardly and downwardly inclined cam portion on the rear end of each track whereby said followers move the carriage downwardly against said yieldable pressure at the end of each rearward stroke of said carriage, means to release the articles from said article-engaging members as the carriage is lowered above said conveyor to deposit the articles upon said conveyor, said motive means serving to impart sudden upward movement to the carriage as the followers move rearwardly beyond the respective cam portions whereby, with each successive forward stroke of the carriage, the followers move above the respective tracks, and said followers being adapted to engage and swing said keeper cams forwardly at the termination of each forward stroke of said carriage to permit a subsequent downward stroke to be imparted to said carriage.

14. A structure according to claim 13 including means responsive to movement of said keeper cams, caused by engagement thereby with said followers at the end of each forward stroke of said carriage, for actuating said motive means to impart a downward stroke to said carriage.

15. A structure according claim 13 wherein said article-engaging members are of the pressure-actuated type, means for admitting pneumatic pressure to the article-engaging members at the end of each downward stroke of said carriage, a suction means, and means operable automatically in the course of each downward movement of the carriage, as effected by engagement of the followers with the cam portions on said tracks for establishing communication between the pressure-actuated article-engaging members and said suction means to thereby quickly exhaust the pressure from said article-engaging members.

16. A structure according to claim 13 wherein said article-engaging members are of the pressure-actuated type, means for admitting pressure to the article-engaging members at the end of each downward stroke of said carriage, a vacuum tank, means to normally create negative pressure in said vacuum tank, and means operable automatically in the course of each downward movement of the carriage, as effected by engagement of the followers with the cam portions on said tracks for establishing communication between the pressure-actuated article-engaging members and said vacuum tank to thereby quickly exhaust the pressure from said article-engaging members.

17. In a case-unloading machine having article-engaging members, a vertically movable carriage supporting said article-engaging members, a case-positioner, a substantially horizontal continuously driven conveyor disposed rearwardly of said case-positioner and on a higher level than said case-positioner, means on said case-positioner for successively positioning cases at the unloading zone to position articles in each successive case for engagement by said article-engaging members, means to impart yieldable upward and downward movements to said carriage, means operable automatically to reciprocate said carriage rearwardly and forwardly upon said carriage being raised a predetermined distance, a follower projecting outwardly from each side of said carriage, a pair of substantially horizontal carriage tracks spaced substantially above said case-positioner and extending rearwardly and overlying said conveyor, a pair of pivoted keeper elements resting against the forward ends of said tracks and their lower surfaces being engageable by said followers at the end of each upward stroke of the carriage, the lower surfaces of said keeper elements being substantially alined with the lower surfaces of said tracks, whereby, upon rearward movement of the carriage, the followers ride in yieldable engagement with the lower surfaces of the respective tracks, the rear ends of said tracks each having a downwardly and rearwardly inclined cam portion thereon to thereby move the carriage and the article-engaging members downwardly at the end of each rearward stroke of the carriage and to deposit articles onto the conveyor, means to release the articles from the article-engaging members with the latter downward movement of the carriage and the members, the yieldable upward pressure on said carriage serving to cause the carriage to dart upwardly as the followers move rearwardly past the respective cam portions whereby the followers pass above said track in the course of subsequent forward movement of the carriage, said followers being adapted to engage the rear surfaces of said pivoted keeper elements to swing the same forwardly as the followers move forwardly of the front ends of said tracks whereby the followers clear the forward end of the tracks in the course of subsequent downward movement therefore of with said carriage.

18. A structure according to claim 17 including means responsive to the latter forward movement of said keeper elements for effecting a downward stroke to said carriage.

19. In a machine for unloading cases and depositing articles on a continuously moving discharge conveyor, said machine having a carriage movable in a substantially vertical plane forwardly of said conveyor, article-engaging members depending from the carriage, a case-positioner conveyor positioned forwardly of and on a lower level than said discharge conveyor, and means for feeding cases of articles to the case-positioner conveyor; the combination of fluid pressure-operated means for raising and lowering said carriage, means under control of said carriage at the end of each downward stroke thereof above the case-positioner conveyor for admitting fluid pressure into the pressure-actuated article-engaging members as the latter members engage said articles, means responsive to a predetermined amount of pressure being present in said pressure-actuated article-engaging members for admitting fluid pressure to the fluid pressure means for raising said carriage, a pair of followers on opposite sides of said carriage, a pivoted keeper element engageable by each of said followers in the course of upward movement of said carriage, a pair of tracks having their lower surfaces substantially alined with the surfaces of said keeper elements and extending rearwardly therefrom and overlying said discharge conveyor, means operable automatically upon engagement of said keeper elements by the followers for imparting a rearward and then a forward stroke to said carriage, whereby the followers move in engagement with the lower surfaces of said tracks in the course of rearward movement of said carriage, the rear end of each of said tracks having a downwardly and rearwardly inclined cam portion thereon for moving the carriage downwardly toward the discharge conveyor, means to exhaust pressure from the pressure-actuated members as said carriage moves downwardly toward the conveyor for releasing the articles from said article-engaging members, the latter means being so arranged as to release the articles just as the followers move past the rear ends of the downwardly and rearwardly inclined cam portions whereby said fluid pressure means for raising the carriage imparts sudden upward movement to the carriage, the followers moving above said tracks in the course of each forward stroke of said carriage, said followers being adapted to engage the pivoted keeper elements and swing the same forwardly away from the forward ends of said tracks at the terminus of each forward stroke of said carriage, and means responsive to the forward movement of said keeper cams for reversing the flow of fluid pressure at said pressure operated means associated with the carriage for imparting a downward stroke to said carriage.

20. A structure according to claim 19 including means to impart a predetermined amount of movement to said case-positioner conveyor in the interim between successive upward and downward strokes of said carriage.

21. In an article handling machine having a carriage, at least one article-engaging member depending from the carriage, and rearwardly movable conveyor means; in combination, means to move said carriage rearwardly above the conveyor means, guide means having a lower surface thereon to guide said carriage during its rearward movement, guide-engaging means on the carriage, engaging said lower surface, said lower surface on the guide means terminating short of the extent of rearward movement of the guide-engaging means, means to release an article from said member as the carriage is moved rearwardly and means independent of said guide means for imparting quick upward movement to said carriage upon movement of the guide-engaging means beyond said guide means.

22. In an article handling machine having a carriage, article-engaging members depending from said carriage, and rearwardly movable conveyor means; the combination of track means provided with a lower surface spaced above and extending substantially parallel to the conveyor means, track-engaging means on the carriage, means resiliently urging said carriage upwardly, means to move said carriage rearwardly to move its track-engaging means beyond said track means, and means to release said articles from said article-engaging members as the carriage moves rearwardly, said resilient means causing said carriage to dart upwardly upon movement of its track-engaging means beyond said track means.

23. In an article handling machine having a carriage, article-engaging members depending from the carriage and a driven rearwardly movable conveyor means; in combination, track means spaced above said conveyor means, said track means having a lower surface, at least a rear portion of said surface extending in converging relation to said conveyor means, track-engaging means on said carriage, means to reciprocate said carriage forwardly and rearwardly, means resiliently urging said carriage upwardly at least during rearward movement thereof and urging said track-engaging means against the lower surface of said track means, rearward movement of said carriage being sufficient to move said track-engaging means beyond said rear portion of said track means, and means to release articles from said members as the members move rearwardly and converge toward the conveyor means whereby the carriage is caused to dart upwardly as the track-engaging means moves beyond the rear portion of said track means.

24. A structure according to claim 23 wherein said means resiliently urging said carriage upwardly moves said track-engaging means above the plane of said track means as said track-engaging means moves beyond said track means whereby said carriage moves above the level of said track means upon subsequent forward movement thereof.

25. A structure according to claim 24 wherein said means resiliently urging said carriage upwardly is operable to lower said carriage at least sufficiently to aline the upper surface of said track-engaging means with the lower surface of said track means upon each forward movement of the track-engaging means beyond the front end of the track means.

References Cited in the file of this patent

UNITED STATES PATENTS

| | | |
|---|---|---|
| 2,707,571 | Smith | May 3, 1955 |
| 2,730,279 | Enock | Jan. 10, 1956 |
| 2,731,127 | Harrison | Jan. 17, 1956 |